(12) United States Patent
Jindal et al.

(10) Patent No.: US 12,032,904 B2
(45) Date of Patent: Jul. 9, 2024

(54) METHOD AND APPARATUS FOR GENERATING STATEMENT

(71) Applicant: Samsung Electronics Co., Ltd., Suwon-si (KR)

(72) Inventors: Tarun Jindal, Dhuri (IN); Siba Prasad Samal, Bangalore (IN); Kumar Vikram, Patna (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/183,847

(22) Filed: Feb. 24, 2021

(65) Prior Publication Data
US 2021/0182481 A1 Jun. 17, 2021

Related U.S. Application Data

(63) Continuation of application No. 15/819,439, filed on Nov. 21, 2017, now Pat. No. 10,943,066.

(30) Foreign Application Priority Data

Nov. 21, 2016 (IN) .............................. 201641039711

(51) Int. Cl.
 *G06F 3/04817* (2022.01)
 *G06F 1/16* (2006.01)
 (Continued)

(52) U.S. Cl.
 CPC ............ *G06F 40/205* (2020.01); *G06F 1/163* (2013.01); *G06F 3/04817* (2013.01);
 (Continued)

(58) Field of Classification Search
 CPC ........ G06F 1/163; G06F 9/4443; G06F 9/542; G06F 9/451; G06F 40/205; H04W 88/02; G06Q 30/02
 See application file for complete search history.

(56) References Cited

U.S. PATENT DOCUMENTS 6,735,487 B1 * 5/2004 Marshall ............. G07F 17/3255
 725/135
7,034,791 B1 4/2006 Odom
 (Continued)

FOREIGN PATENT DOCUMENTS

| EP | 3054647 A1 * | 8/2016 | ............. H04L 67/22 |
| KR | 10-1645039 B1 | 8/2016 | |
| WO | WO-2012071384 A2 * | 5/2012 | ............. G06F 15/16 |

OTHER PUBLICATIONS

Semil Shah, "The Precise Art of Mobile Push Notifications", published on Oct. 13, 2013 to Tech Crunch blog, retrieved on Mar. 23, 2022 . (Year: 2013).*

(Continued)

*Primary Examiner* — Shourjo Dasgupta
(74) *Attorney, Agent, or Firm* — Jefferson IP Law, LLP

(57) ABSTRACT

A method implemented in an electronic device is provided. The method includes determining at least one update of content of at least one application, wherein the at least one update is associated with an activity related to the content accessed by a user, generating at least one statement corresponding to the at least one update of the content of the at least one application in accordance with the activity related to the content.

16 Claims, 25 Drawing Sheets

(51) Int. Cl.
*G06F 9/451* (2018.01)
*G06F 9/54* (2006.01)
*G06F 40/205* (2020.01)
*G06Q 30/02* (2023.01)
*H04W 88/02* (2009.01)

(52) U.S. Cl.
CPC ............. *G06F 9/451* (2018.02); *G06F 9/542* (2013.01); *G06Q 30/02* (2013.01); *H04W 88/02* (2013.01)

(56) References Cited

U.S. PATENT DOCUMENTS

| | | | | |
|---|---|---|---|---|
| 7,069,309 | B1* | 6/2006 | Dodrill | H04L 67/51 709/219 |
| 8,291,453 | B2* | 10/2012 | Boortz | H04N 21/435 725/62 |
| 8,881,170 | B2* | 11/2014 | Beilis | G06F 9/546 719/310 |
| 8,924,493 | B1 | 12/2014 | Yeskel et al. | |
| 9,239,987 | B1 | 1/2016 | Tsao | |
| 9,406,103 | B1* | 8/2016 | Gray | G06F 3/0482 |
| 9,432,821 | B2* | 8/2016 | Van Snellenberg | H04L 67/02 |
| 9,448,680 | B2 | 9/2016 | Woley et al. | |
| 9,654,598 | B1* | 5/2017 | Crawford | H04W 4/023 |
| 10,034,129 | B1* | 7/2018 | Ellis | H04W 4/023 |
| 10,212,243 | B2* | 2/2019 | Jiang | H04L 67/52 |
| 10,410,272 | B1* | 9/2019 | Johnson | G06Q 30/0631 |
| 10,551,995 | B1* | 2/2020 | Ho | G06F 3/04817 |
| 10,754,518 | B1* | 8/2020 | Bell | H04M 1/72484 |
| 11,157,970 | B1* | 10/2021 | Massanek | H04L 65/61 |
| 2004/0189712 | A1* | 9/2004 | Rundell | G06F 9/451 715/808 |
| 2007/0192733 | A1 | 8/2007 | Horiuchi | |
| 2008/0076469 | A1 | 3/2008 | Shin et al. | |
| 2009/0234844 | A1 | 9/2009 | Kaehler et al. | |
| 2010/0077347 | A1 | 3/2010 | Kirtane et al. | |
| 2010/0173623 | A1* | 7/2010 | Takami | H04M 1/72403 455/553.1 |
| 2010/0281409 | A1 | 11/2010 | Rainisto et al. | |
| 2011/0119601 | A1 | 5/2011 | Knothe et al. | |
| 2011/0167383 | A1* | 7/2011 | Schuller | G06F 9/451 455/566 |
| 2011/0184899 | A1* | 7/2011 | Gadanho | G06Q 30/02 706/46 |
| 2011/0252430 | A1* | 10/2011 | Chapman | G06F 9/485 718/107 |
| 2012/0004943 | A1* | 1/2012 | Reichman | G06Q 10/06314 705/7.24 |
| 2012/0233560 | A1* | 9/2012 | Schneider | G06F 3/04817 715/765 |
| 2012/0245971 | A1* | 9/2012 | Reichman | G06Q 10/109 705/7.19 |
| 2012/0260217 | A1 | 10/2012 | Celebisoy | |
| 2012/0290434 | A1* | 11/2012 | Moritz | G06Q 30/0261 705/26.7 |
| 2012/0303415 | A1* | 11/2012 | Edelson | G06Q 30/0282 705/7.32 |
| 2013/0006848 | A1* | 1/2013 | Kuttuva | G06Q 20/3223 705/39 |
| 2013/0073392 | A1* | 3/2013 | Allen | G06Q 30/0633 705/26.8 |
| 2013/0080471 | A1 | 3/2013 | Forte et al. | |
| 2013/0132854 | A1* | 5/2013 | Raleigh | H04M 15/77 715/738 |
| 2013/0174137 | A1 | 7/2013 | Kim | |
| 2013/0179698 | A1 | 7/2013 | Woods et al. | |
| 2013/0219332 | A1 | 8/2013 | Woley et al. | |
| 2013/0219409 | A1* | 8/2013 | Woley | G06F 9/542 719/313 |
| 2013/0227419 | A1 | 8/2013 | Lee et al. | |
| 2013/0275505 | A1* | 10/2013 | Gauglitz | G06F 3/0482 709/204 |
| 2014/0019873 | A1* | 1/2014 | Gupta | G06F 9/451 715/744 |
| 2014/0180817 | A1* | 6/2014 | Zilkha | G06F 16/24575 705/14.55 |
| 2014/0188335 | A1* | 7/2014 | Madhok | G06F 9/451 718/104 |
| 2014/0189592 | A1 | 7/2014 | Benchenaa et al. | |
| 2014/0282084 | A1 | 9/2014 | Murarka et al. | |
| 2014/0324771 | A1 | 10/2014 | Kim et al. | |
| 2014/0325556 | A1* | 10/2014 | Hoang | H04N 21/2665 725/32 |
| 2015/0007294 | A1 | 1/2015 | Wang | |
| 2015/0026325 | A1* | 1/2015 | Rheinheimer | H04L 51/26 709/223 |
| 2015/0057019 | A1* | 2/2015 | Wendling | H04W 64/00 455/456.1 |
| 2015/0112883 | A1* | 4/2015 | Orduna | G06Q 50/265 705/325 |
| 2015/0160976 | A1* | 6/2015 | Kim | G06F 9/4881 718/108 |
| 2015/0212674 | A1* | 7/2015 | Firstenberg | G06F 3/0484 715/747 |
| 2015/0264292 | A1* | 9/2015 | Greene | G06F 3/0488 386/248 |
| 2015/0289100 | A1* | 10/2015 | Stringer, II | H04W 4/021 455/456.3 |
| 2015/0334772 | A1* | 11/2015 | Wong | H04W 4/025 455/557 |
| 2015/0350807 | A1* | 12/2015 | Andrews | H04W 4/60 455/414.2 |
| 2015/0358766 | A1* | 12/2015 | McDevitt | H04W 4/021 455/456.2 |
| 2015/0363244 | A1* | 12/2015 | Bott | H04W 4/18 719/328 |
| 2016/0007282 | A1* | 1/2016 | Cuervo-Laffaye | H04L 67/22 370/311 |
| 2016/0019194 | A1* | 1/2016 | Mondal | G06F 1/329 715/234 |
| 2016/0034145 | A1 | 2/2016 | Lee et al. | |
| 2016/0048398 | A1* | 2/2016 | Taylor | G06F 9/4881 717/168 |
| 2016/0062732 | A1 | 3/2016 | Jaygar et al. | |
| 2016/0173700 | A1* | 6/2016 | O'Connor | G06Q 30/08 455/405 |
| 2016/0189316 | A1* | 6/2016 | Lenahan | G06Q 50/01 705/26.41 |
| 2016/0275557 | A1* | 9/2016 | Barrand | H04W 4/021 |
| 2016/0283020 | A1 | 9/2016 | Heo et al. | |
| 2016/0358537 | A1* | 12/2016 | Kang | G09G 3/20 |
| 2017/0085941 | A1* | 3/2017 | Gupta | H04N 21/4263 |
| 2017/0124548 | A1* | 5/2017 | Bolla | H04W 4/023 |
| 2017/0142046 | A1 | 5/2017 | Abou Mahmoud et al. | |
| 2017/0199749 | A1 | 7/2017 | Wolfson et al. | |
| 2017/0262825 | A1* | 9/2017 | Conway | G06F 21/105 |
| 2017/0289088 | A1 | 10/2017 | Quintero | |
| 2018/0341937 | A1* | 11/2018 | Kim | G06Q 20/227 |

OTHER PUBLICATIONS

Suresh Kumar Gudla et al., "A Unified Push Notifications Service for Mobile Devices", published or made available in Jul. 10-11, 2015 at 2015 IEEE International Conference on Electronics, Computing and Communication Technologies in Bangalore, India, retrieved from IEEE Xplore on Mar. 23, 2022. (Year: 2015).*

Seyhmus Olker, "Optimizing Push Notifications to Increase App Retention", published on Oct. 20, 2015 to https://growthtower.com/optimizing-push-notifications-to-increase-app-retention, retrieved on Mar. 23, 2022. (Year: 2015).*

"What are Push Notifications? A Complete Guide", published on Mar. 28, 2016 to https://vwo.com/push-notifications, retrieved on Mar. 23, 2022. (Year: 2016).*

"Push Notifications: A Review of Best Practices for Mobile Product Managers", published on Sep. 14, 2016 to https://count.ly/resources/white-papers/countly_push-notifications-a-review-of-best-practices-for-mobile-product-managers.pdf, retrieved Mar. 23, 2022. (Year: 2016).*

(56) References Cited

OTHER PUBLICATIONS

European Search Report dated Apr. 14, 2022; European Appln. No. 17 870 981.2-1203.
1 European Preliminary Opinion dated Oct. 10, 2022; European Appln. No. 17 870 981.2.
European Decision to Refuse dated Nov. 21, 2022; European Appln. No. 17 870 981.2-1203.

* cited by examiner

METHOD AND APPARATUS FOR GENERATING STATEMENT

CROSS-REFERENCE TO RELATED APPLICATION(S)

This application is a continuation application of prior application Ser. No. 15/819,439, filed on Nov. 21, 2017, which claims the benefit under 35 U.S.C. § 119(a) of an Indian patent application filed on Nov. 21, 2016 in the Indian Patent Office and assigned Serial number 201641039711, the entire disclosure of which is hereby incorporated by reference.

TECHNICAL FIELD

The present disclosure relates to an update of content of an application. More particularly, the present disclosure relates to a method of determining whether an update of content of an application was performed and generating a statement corresponding to the update of the content of the application in accordance with an activity related to the content.

BACKGROUND ART

Electronic devices, such as mobile phones, smartphones, and the like, have gained considerable importance due to their functionalities which provide an additional level of convenience to users. A user may interact with such an electronic device in order to access an application or content through a touch input on a screen of the electronic device. The application(s) which is recently accessed by the user remain running in the background screen of the electronic device. However, the background screen of the electronic device is static, and therefore, the application(s) running in the background screen does not receive any updates. Accordingly, the user has to check for updates for the application(s) by launching the application(s) or reloading the webpage displayed on the background screen in order to view the updates for the application(s) or webpage(s) on the background screen. Thus, manual intervention should be involved in accessing the updated content of the application (s).

Therefore, a need exists for a method of determining whether an update of content of an application was performed and generating, upon a result of the determining, a statement corresponding to the update of the content of the application in accordance with an activity related the content.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of determining whether an update of content of an application was performed and generating, upon a result of the determining, a statement corresponding to the update of the content of the application in accordance with an activity related the content.

In accordance with an aspect of the present disclosure, a method of generating an update notice in an electronic device is provided. The method includes determining, by the electronic device, whether at least one update of content of at least one application is performed, wherein the at least one update is associated with an activity related to the content accessed by a user, and generating, upon a determining result, at least one statement corresponding to the at least one update of the content of the at least one application.

Another aspect of the present disclosure is to provide a method of detecting an event and rendering a statement in the application in response to the event. The statement represents a meaningful set of data that corresponds to the update of the content of the application.

Another aspect of the present disclosure is to provide a method of obtaining an input with regard to the statement and rendering the update of the content of the application in response to the input.

Another aspect of the present disclosure to provide a method of determining whether a plurality of updates of content of an application were performed and generating a plurality of statements respectively corresponding to the plurality of updates of the content of the application in accordance with a plurality of activities related to the content.

Another aspect of the present disclosure to provide a method of associating the plurality of updates of the content of the application running in the background with respect to an application being accessed by the user in the foreground.

Another aspect of the present disclosure is to provide a method of detecting an event and rendering the plurality of statements in the application in response to the event.

Another aspect of the present disclosure is to provide a method of detecting an event that triggers rendering of the statement. Further, the method includes rendering the statement in the application in response to the event.

In an embodiment of the present disclosure, the event corresponds to at least one of switching to a background screen from a foreground screen in the electronic device, powering the electronic device on or off, switching the electronic device from a sleep mode to an active mode, activating the electronic device by receiving a password, and unlocking the electronic device.

In an embodiment of the present disclosure, rendering the statement in the first application includes overlaying the statement on the content of the first on second application.

In an embodiment of the present disclosure, rendering the statement in the application includes presenting the statement in a marquee form.

Further, the method includes obtaining an input on the statement. Further, the method includes rendering the update in the content in the application in response to the input.

In an embodiment of the present disclosure, an icon of the application is rendered along with the statement.

In an embodiment of the present disclosure, the statement is presented in at least one of a text form and an audio form.

In an embodiment of the present disclosure, the event corresponds to accessing the application on a wearable device and the statement is rendered while accessing the application on the wearable device.

In accordance with another aspect of the present disclosure, a method implemented in an electronic device is provided. The method includes determining a plurality of updates of content of an application, wherein the plurality of updates are respectively associated with a plurality of activities related to the content accessed by a user. Further, the method includes generating a plurality of statements corresponding to the plurality of updates of the content of the application in accordance with the plurality of activities related to the content.

In an embodiment of the present disclosure, the method further includes detecting an event that triggers rendering of the plurality of statements. Further, the method includes rendering the plurality of statements in the application in response to the event.

In an embodiment of the present disclosure, a statement from among the plurality of statements is highlighted by determining an interest of the user associated with the activity related to the content accessed by the user.

In an embodiment of the present disclosure, the event corresponds to switching to a background screen from a foreground screen in the electronic device.

In accordance with another aspect of the present disclosure, a method implemented in an electronic device is provided. The method includes determining a plurality of updates of content of a plurality of applications, wherein the plurality of updates are associated with a plurality of activities in the content accessed by a user in each of the applications. Further, the method includes generating a statement corresponding to the plurality of updates of the content of the plurality of applications in accordance with a plurality of activities related to the content of each of the applications.

Further, the method includes categorizing the plurality of applications based on a degree of similarity of the content of the plurality of applications. The method includes detecting an event that triggers rendering of the statement. The method includes rendering the statement in the categorized plurality of applications in response to the event.

In an embodiment of the present disclosure, the event corresponds to switching to a background screen from a foreground screen in the electronic device.

In accordance with another aspect of the present disclosure, a method implemented in an electronic device is provided. The method includes parsing a text in a primary application. Further, the method includes generating a statement in a secondary application by mapping the parsed text to a feature supported by the secondary application.

Further, the method includes detecting an event that triggers rendering of the statement. The method includes rendering the statement in the secondary application in response to the event.

In an embodiment of the present disclosure, the event corresponds to switching to a background screen from a foreground screen in the electronic device.

In an embodiment of the present disclosure, the rendering of the statement in the secondary application includes overlaying the statement on the content of the secondary application.

In accordance with another aspect of the present disclosure, an apparatus of generating an update notice is provided. The apparatus includes a processor configured to determine whether at least one update of content of at least one application is performed, wherein the at least one update is associated with an activity related to the content accessed by a user, and generate, upon a determining result, at least one statement corresponding to the at least one update of the content of the at least one application.

In accordance with another aspect of the present disclosure, at least one non-transitory computer-readable recording medium configured to store a program that, when executed by a computer, performs actions including determining whether at least one update of content of at least one application was performed, wherein the at least one update is associated with an activity related to the content accessed by a user and generating at least one statement corresponding to the at least one update of the content of the at least one application in accordance with the activity related to the content.

In accordance with another aspect of the present disclosure, at least one non-transitory computer-readable recording medium configured to store a program that, when executed by a computer, performs actions including parsing a text in a primary application and generating a statement in a secondary application by mapping the parsed text to a feature supported by the secondary application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
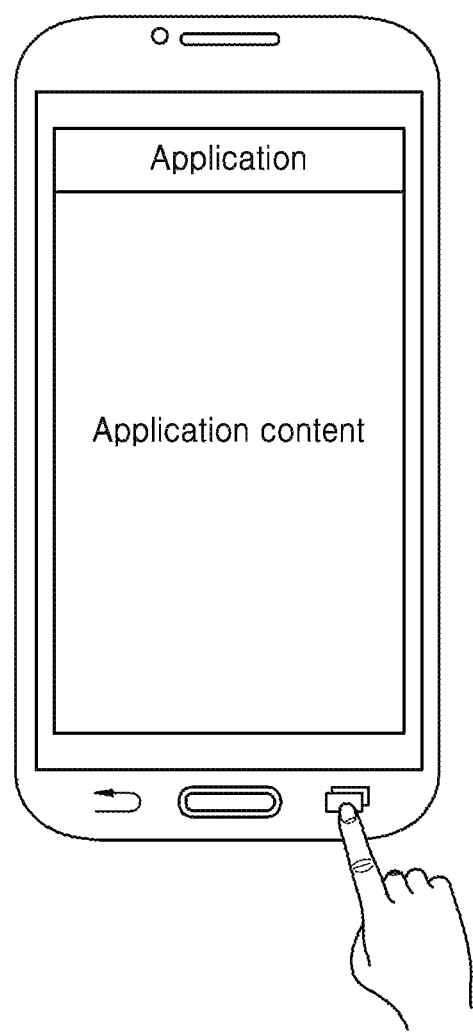
FIGS. 1A and 1B illustrate an electronic device in which a statement corresponding to an update of content of an application is generated and displayed according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The various embodiments herein provide a method implemented in an electronic device. The method includes determining whether an update of content of an application was performed, wherein the update is associated with an activity related to the content accessed by a user. Further, the method includes generating a statement corresponding to the update of the content of the application in accordance with the activity related to the content.

The various embodiments herein provide a method implemented in an electronic device. The method includes determining whether a plurality of updates of content of an application were performed, wherein the plurality of updates are respectively associated with a plurality of activities related to the content accessed by a user. Further, the method includes generating a plurality of statements respectively corresponding to the plurality of updates of the content of the application in accordance with the plurality of activities related to the content.

The various embodiments herein provide a method implemented in an electronic device. The method includes determining whether a plurality of updates of content of a plurality of applications were performed, wherein the plurality of updates are associated with a plurality of activities related to the content accessed by a user in each of the applications. Further, the method includes generating a statement corresponding to the plurality of updates of the content of the plurality of applications in accordance with the plurality of activities related the content of each of the applications.

The various embodiments herein disclose a method implemented in an electronic device. The method includes parsing a text in a primary application. Further, the method includes generating a statement in a secondary application by mapping the parsed text to a feature supported by the secondary application.

Unlike existing methods, the proposed method generates a statement corresponding to an update of content of an application in accordance with an activity related to the content. The electronic device detects an activity of a user in relation to an application in a foreground screen. Based on the determined user activity, when the user switches from the foreground screen to the background screen, the electronic device determines whether an update of content of the application was performed and generates a statement corresponding to the update of the content of the application. Further, the generated statement is rendered by overlaying it on the content of the application. The statement may be a progress/update of the application since last viewed by the user in the foreground screen.

In existing mechanisms, applications in a background screen of an electronic device are static and they do not show any update when the user switches from the foreground screen to the background screen. The user has to manually check for updates by launching each of the applications or reloading it. However, according to the proposed method, the updates of the application are rendered when the user switches from the foreground screen to the background screen.

Referring now to FIGS. 1A, 1B, 2, 3A, 3B, 4A, 4B, 5A, 5B, 6A, 6B, 6C, 7A, 7B, 8, 9, 10, 11, 12, 13, 14, 15, 16A, 16B, 16C, 17, 18A, 18B, 18C, 19, and 20, similar reference characters denote corresponding features consistently throughout the figures.

Figure 1B:
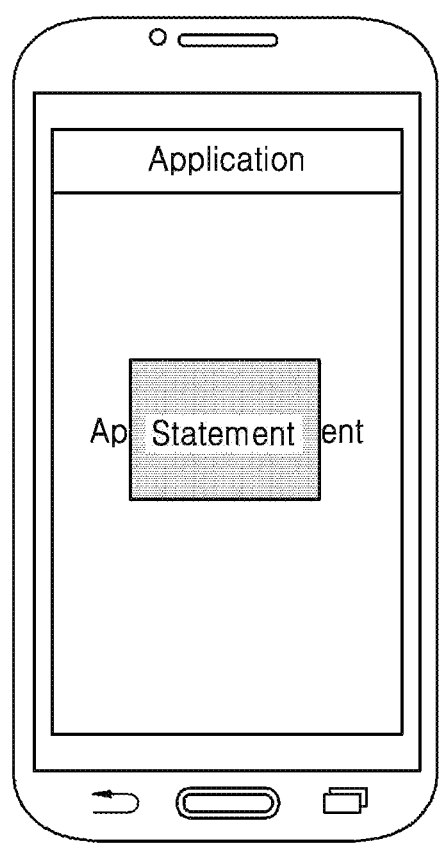

FIGS. 1A and 1B illustrate an electronic device in which a statement corresponding to an update of content of an application is generated and displayed according to various embodiments of the present disclosure.

Referring to FIGS. 1A and 1B, an electronic device 100 may be, for example, a mobile phone, a smartphone, a personal digital assistant (PDA), a tablet, a phablet, a consumer electronic device, a dual-display device, or any other electronic device. Referring to FIG. 1A, an application is accessed in the electronic device 100. The application displays content associated with the application. The electronic device 100 determines whether an update of content of the application accessed in the electronic device 100 was performed. The update is associated with an activity related to the content accessed by a user. According to an embodiment of the present disclosure, it is considered that the user accesses an e-commerce application and searches for items with discounted prices. At that instance, the discounted prices on the items may not be available to the user. At a later instance, the discounted prices on the items are available on the e-commerce application. According to an embodiment of the present disclosure, the update of the content associated with an activity related the content accessed by the user includes showing the discounted prices on the items.

When it is determined that the update of the content of the application was performed, the electronic device 100 generates a statement corresponding to the update of the content of the application in accordance with the activity related to the content. After generating the statement corresponding to the update of the content of that, the electronic device 100 detects an event therein. The event corresponds to switching to a background screen from a foreground screen in the electronic device 100. When the electronic device 100 detects that the user switched to the background screen from the foreground screen, the electronic device 100 renders the statement. Although switching from the foreground screen to the background screen is illustrated as an example of an event, other events may be possible in another embodiment of the present disclosure. According to an example embodiment of the present disclosure, the event may be switching from the background screen to the foreground screen, powering the electronic device 100 on or off, switching the electronic device 100 from a sleep mode to an active mode, activating the electronic device 100 by inputting a password or unlocking it, or any method set by a user's choice.

In an embodiment of the present disclosure, the statement is rendered by overlaying it on the content of the application as illustrated in FIG. 1B.

In an embodiment of the present disclosure, the statement is presented in a marquee form.

In an embodiment of the present disclosure, a plurality of updates of the content of the application running in the background screen is associated with an application being accessed in the foreground screen. In an example embodiment of the present disclosure, when a football application is running in the background screen, a score update in the football application is associated with an application being accessed by the user in the foreground screen.

Various example scenarios for rendering the statement(s) are provided in conjunction with the figures in the later parts of the description.

Figure 2:
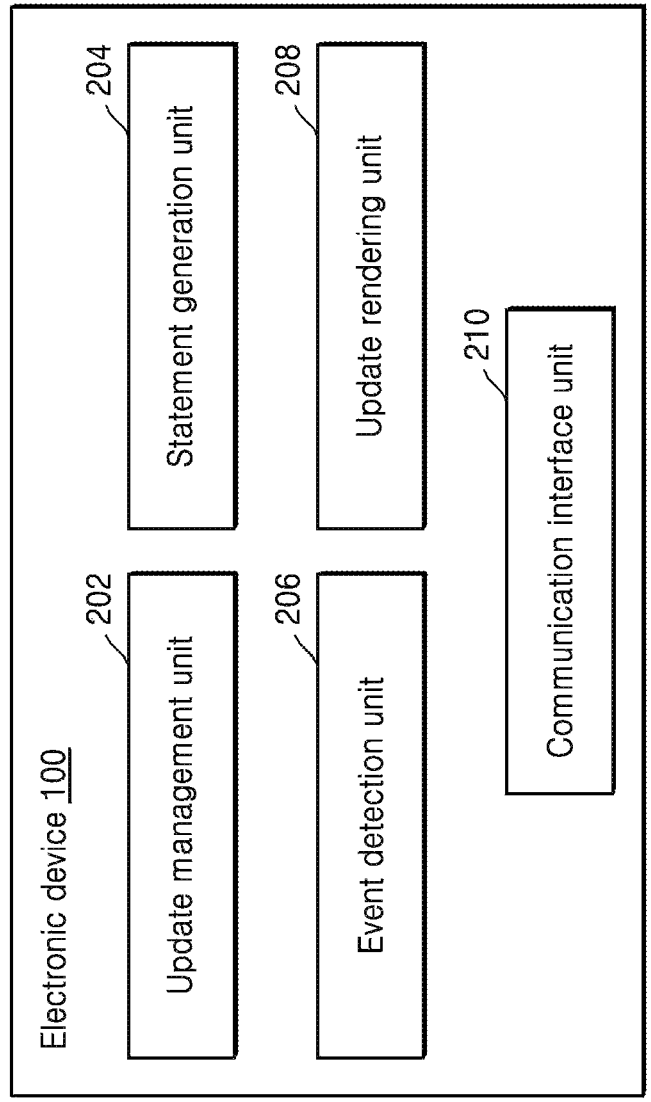
FIG. 2 illustrates components of an electronic device according to an embodiment of the present disclosure.

FIG. 2 illustrates various components of an electronic device according to an embodiment of the present disclosure.

Referring to FIG. 2, the electronic device 100 includes an update management unit 202, a statement generation unit 204, an event detection unit 206, an update rendering unit 208, and a communication interface unit 210. Although various units are depicted as separate units in FIG. 2, the update management unit 202, the statement generation unit 204, the event detection unit 206, the update rendering unit 208, and the communication interface unit 210 can be implemented as a at least one hardware processor. Therefore, the following operation performed in each of the unit can be performed by the at least one hardware processor.

The update management unit 200 is configured to determine whether an update of the content of an application was performed. The update is associated with an activity related to the content accessed by a user. Further, the update management unit 202 is configured to determine whether a plurality of updates of content of an application was performed. The plurality of updates is associated with a plurality of activities related to the content accessed by the user.

In an embodiment of the present disclosure, the update management unit 202 is configured to categorize the plurality of applications based on a degree of similarity of the content in the plurality of applications.

In an embodiment of the present disclosure, the update management unit 202 is configured to parse a text in a first (primary) application. In an example embodiment of the present disclosure, the first (primary) application may be a messaging application, a chat application or the like.

The statement generation unit 204 is configured to generate the statement corresponding to the update of the content of the application in accordance with the activity related to the content. In an embodiment of the present disclosure, the statement is presented in at least one of a textual form and an audio form.

The statement generation unit 204 is configured to generate a plurality of updates of the content of the application, wherein the plurality of updates are associated with a plurality of activities related to the content accessed by the user. Further, the statement generation unit 204 is configured to generate the statement corresponding to the plurality of updates of the content of the plurality of applications in accordance with the plurality of activities related to the content of each of the applications.

Further, the statement generation unit 204 is configured to generate the statement in a second (secondary) application by mapping the parsed text to a feature supported by the secondary application. In an embodiment of the present disclosure, the secondary application may be determined based on the parsed text. In an example embodiment of the present disclosure, if the parsed text includes a meeting place such as a hotel, then the secondary application may be an application that provides coupons for availing various services at the hotel. The secondary application may be a cab booking application, which enables the user to book a cab to reach the hotel.

The event detection unit 206 is configured to detect an event. Further, the event triggers rendering of the statement. In an embodiment of the present disclosure, the event corresponds to switching to the background screen from the foreground screen in the electronic device 100.

The update rendering unit 208 is configured to render the statement in the application in response to the event. The event triggers rendering of the plurality of statements. In an embodiment of the present disclosure, rendering the statement in the application includes overlaying the statement on the content of the application. In another embodiment of the present disclosure, rendering the statement in the application includes presenting the statement in a marquee form. In an example, the update statement is rendered in a title of the application. Further, the rendered update statement may be scrolling/marquee in the title of the statement along with the application title. In an example embodiment of the present disclosure, the update statement is rendered in a marquee form on a home screen of the electronic device 100.

Further, the update rendering unit 208 is configured to render the plurality of statements in the application in response to the event. In an embodiment of the present disclosure, a statement from among the plurality of statements is highlighted by determining an interest of the user associated with the activity related to the content accessed by the user.

In an embodiment of the present disclosure, the update rendering unit 208 is configured to render the statement in the categorized plurality of applications in response to the event.

In an embodiment of the present disclosure, the update rendering unit 208 is configured to render the statement in the secondary application in response to the event. The event corresponds to switching to the background screen from the foreground screen in the electronic device 100. In an embodiment of the present disclosure, rendering the statement in the secondary application includes overlaying the statement on the content of the secondary application.

The communication interface unit 210 is configured to communicate with a network such as the Internet for determining whether updates to the application(s) accessed in the electronic device 100 were performed.

FIG. 2 illustrates units of the electronic device 100, but the embodiment is not limited thereto. In other embodiments, the electronic device 100 may include less or more units. Further, the labels or names of the units are only for illustrative purpose and do not limit the scope of the inventive concept. One or more units may be combined together to perform same or substantially similar function in the electronic device 100.

Figure 3A:
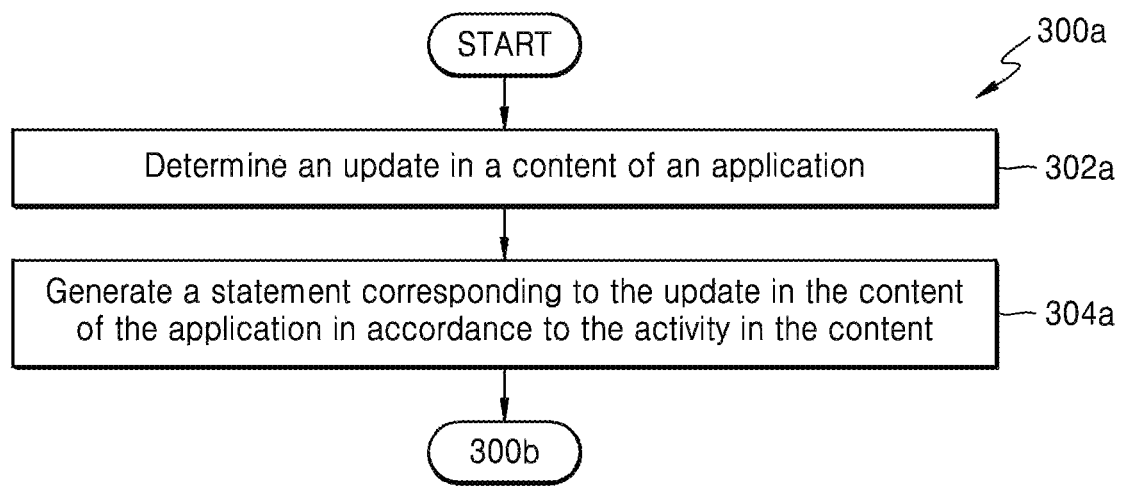
FIG. 3A is a flow diagram illustrating a method of generating a statement corresponding to an update of content of an application according to an embodiment of the present disclosure.

FIG. 3A is a flow diagram illustrating a method of generating a statement corresponding to an update of content of an application according to an embodiment of the present disclosure.

Referring to FIG. 3A, in operation 302*a* of a flow diagram 300*a*, the method includes determining, by the update management unit 202, whether an update of content of an application was performed. In an example embodiment of the present disclosure, the application may be a location application accessed by the user in the foreground screen and the update is associated with the content accessed by the user in the location application. The update management unit 202 determines whether the update (i.e., time to home: 30 minutes) in the location application was performed.

In operation 304*a*, the method includes generating, by the statement generation unit 204, a statement corresponding to the update of the content of the application in accordance with the activity related to the content. Based on the determined update, the statement corresponding to the update of the content of the location application is generated. The statement includes "time to home: 30 minutes".

Various actions, acts, blocks, operations, or the like in the method and the flow diagram 300*a* may be performed in the order presented, in a different order or simultaneously. Further, in some embodiments, some of the actions, acts, blocks, operations, or the like may be omitted, added, modified, skipped, or the like without departing from the scope of the disclosure.

Figure 3B:
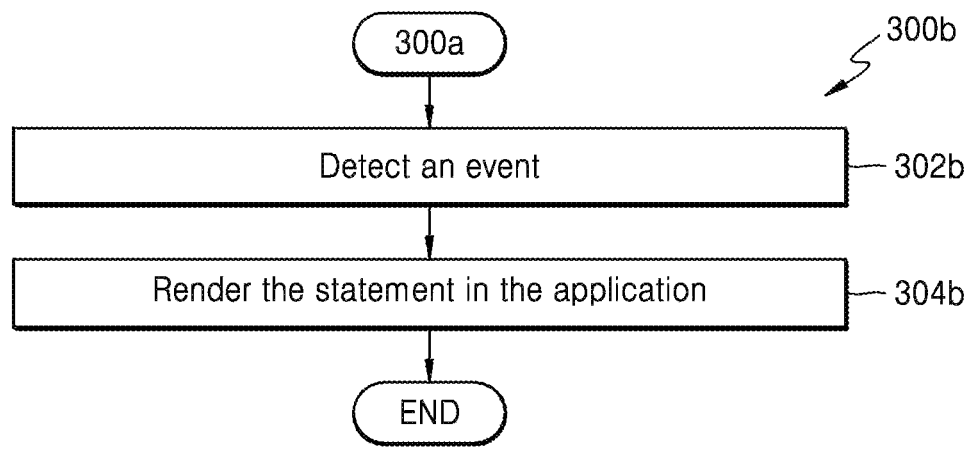
FIG. 3B is a flow diagram illustrating a method of rendering a statement in an application according to an embodiment of the present disclosure.

FIG. 3B is a flow diagram illustrating a method of rendering a statement in an application according to an embodiment of the present disclosure.

Referring to FIG. 3B, in a flow diagram 300*b*, the operations of the flow diagram 300*a* as described in FIG. 3A are initially performed.

In operation 302*b*, the method includes detecting an event by the event detection unit 206. The event includes switching to the background screen from the foreground screen. The user switches to the background screen from the foreground screen of the electronic device 100.

In operation 304*b*, the method includes rendering, by the update rendering unit 208, the statement in the application. The statement is rendered in the application in response to the detected event. In an embodiment of the present disclosure, the statement is rendered by overlaying the statement on the application content in the background screen.

Various actions, acts, blocks, operations, or the like in the method and the flow diagram 300*b* may be performed in the order presented, in a different order or simultaneously. Further, in some embodiments, some of the actions, acts, blocks, operations, or the like may be omitted, added, modified, skipped, or the like without departing from the scope of the disclosure.

Figure 4A:
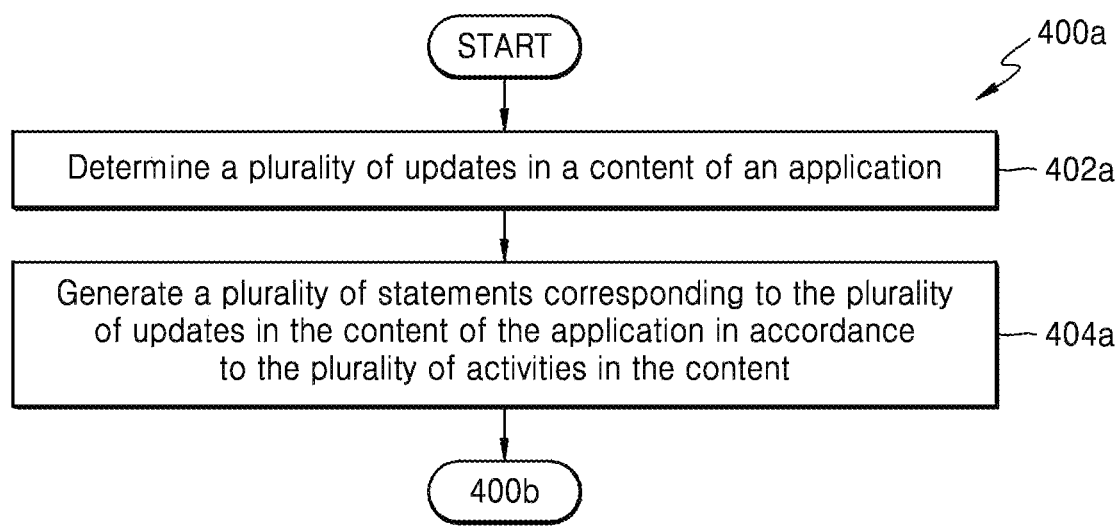
FIG. 4A is a flow diagram illustrating a method of generating a plurality of statements respectively corresponding to a plurality of updates of content of an application according to an embodiment of the present disclosure.

FIG. 4A is a flow diagram illustrating a method of generating a plurality of statements corresponding to a plurality of updates of content of an application according to an embodiment of the present disclosure.

Referring to FIG. 4A, in operation 402*a* of a flow diagram 400*a*, the method includes determining, by the update management unit 202, whether a plurality of updates of content of an application were performed. In an example embodiment of the present disclosure, if the user is accessing an e-commerce application and searches for products available with discounted prices, the update management unit 202 determines whether the plurality of updates corresponding to the products available for discounted prices were performed.

In operation 404*a*, the method includes generating, by the statement generation unit 204, a plurality of statements corresponding to the plurality of updates of the content of the application in accordance with the plurality of activities related to the content. Since, the user activity includes searching for the products with discounted prices, the plurality of statements corresponding to the plurality of updates of the content of the application based on the activities of the user are generated.

Various actions, acts, blocks, operations, or the like in the method and the flow diagram 400*a* may be performed in the order presented, in a different order or simultaneously. Further, in some embodiments, some of the actions, acts, blocks, operations, or the like may be omitted, added, modified, skipped, or the like without departing from the scope of the disclosure.

Figure 4B:
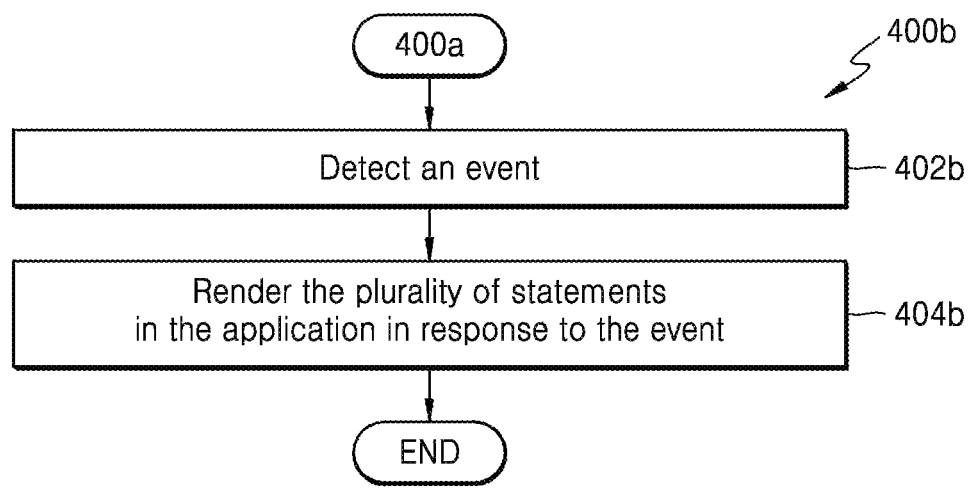
FIG. 4B is a flow diagram illustrating a method of rendering a plurality of statements in an application according to an embodiment of the present disclosure.

FIG. 4B is a flow diagram illustrating a method of rendering a plurality of statements in an application according to an embodiment of the present disclosure.

Referring to FIG. 4B, in a flow diagram 400b, the operations of the flow diagram 400a as described in FIG. 4A are initially performed.

In operation 402b, the method includes detecting, by the event detection unit 206, an event. The event includes switching to the background screen from the foreground screen. The user switches to the background screen from the foreground screen of the electronic device 100. The event detection unit 206 detects the switching event.

In operation 404b, the method includes rendering, by the update rendering unit 208, the plurality of statements in the application in response to the event. In response to the switching event, the update rendering unit 208 renders the plurality of statements in the application. In an example embodiment of the present disclosure, a statement 1 includes T-shirts with discounted prices of 70%, a statement 2 includes home appliances with discounted prices of 30%, a statement 3 includes electronic gadgets with discounted prices of 10%, and so on.

Various actions, acts, blocks, operations, or the like in the method and the flow diagram 400b may be performed in the order presented, in a different order or simultaneously. Further, in some embodiments, some of the actions, acts, blocks, operations, or the like may be omitted, added, modified, skipped, or the like without departing from the scope of the disclosure.

Figure 5A:
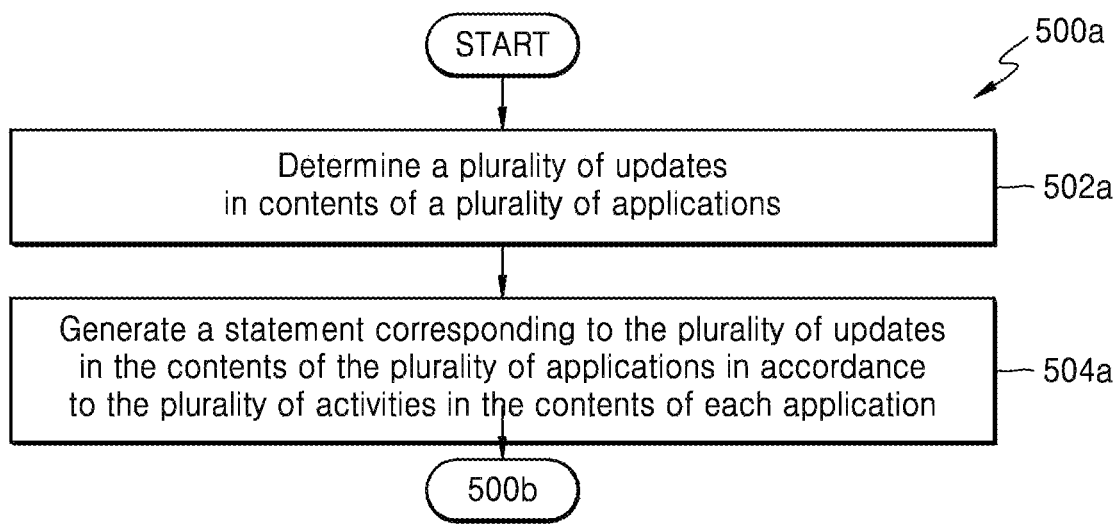
FIG. 5A is a flow diagram illustrating a method of generating a statement corresponding to a plurality of updates of content of a plurality of applications according to an embodiment of the present disclosure.

FIG. 5A is a flow diagram illustrating a method of generating a statement corresponding to a plurality of updates in content of a plurality of applications according to an embodiment of the present disclosure.

Referring to FIG. 5A, in operation 502a of a flow diagram 500a, the method includes determining, by the update management unit 202, whether a plurality of updates of content of a plurality of applications was performed. In an example embodiment of the present disclosure, the plurality of applications may be a map application, a sports-related application such as a football application and a flight booking application. The updates are associated with an activity related to the content accessed by the user in the in the map application, the sports-related application and the flight booking application. The user activity may include checking the distance between office and home in the map application, checking the score of an ongoing match between team A and Team B in the sports-related application, and checking flights between two places in the flight booking application.

In operation 504a, the method includes generating, by the statement generation unit 204, upon a determining result, a statement corresponding to the plurality of updates of the content of the plurality of applications in accordance with the plurality of activities related to the content of each of the applications. Based on the determined updates in the plurality of the applications, the statement generation unit 204 generates a plurality of statements corresponding to the updates of the content of the map application, the football application and the flight booking application in accordance with the activity related to the content of each of the applications.

Various actions, acts, blocks, operations, or the like in the method and the flow diagram 500a may be performed in the order presented, in a different order or simultaneously. Further, in some embodiments, some of the actions, acts, blocks, operations, or the like may be omitted, added, modified, skipped, or the like without departing from the scope of the disclosure.

Figure 5B:
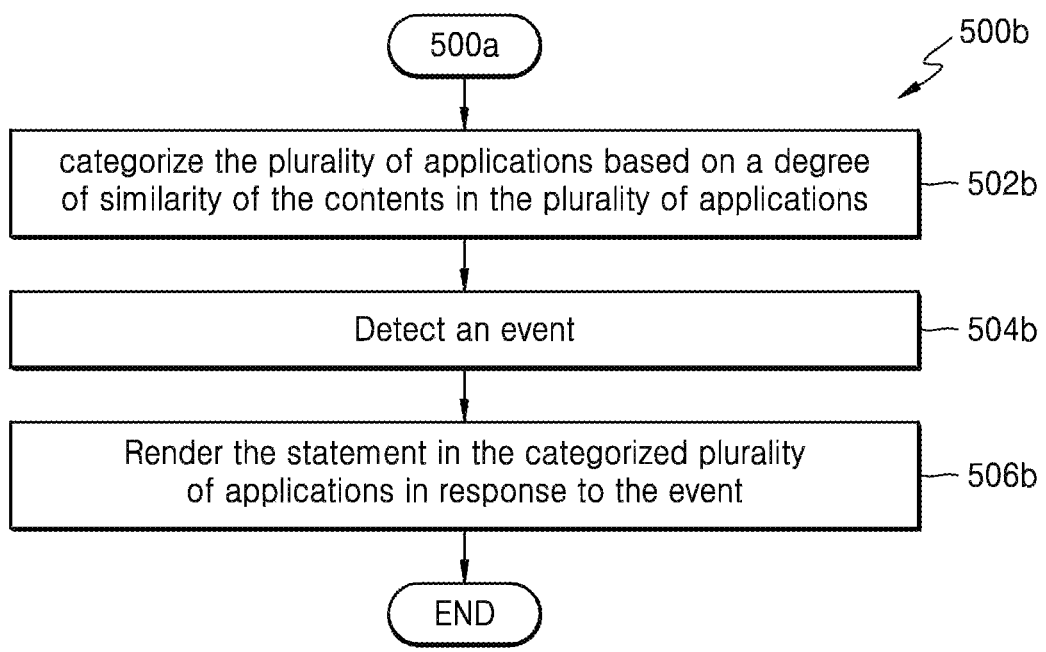
FIG. 5B is a flow diagram illustrating a method of rendering a statement in categorized plurality of applications according to an embodiment of the present disclosure.

FIG. 5B is a flow diagram illustrating a method of rendering a statement in a categorized plurality of applications according to an embodiment of the present disclosure.

Referring to FIG. 5B, in a flow diagram 500b, the operations of the flow diagram 500a as described in FIG. 5A are initially performed.

In operation 502b, the method includes categorizing, by the statement generation unit 204, the plurality of applications based on a degree of similarity of the content in the plurality of applications. In an example embodiment of the present disclosure, a plurality of applications such as a shopping application and other e-commerce related applications categorized since these applications similar content. Other than a degree of similarity, other criteria may be a basis for categorizing the plurality of applications. In an example embodiment of the present disclosure, data related to the applications, the title or name of the applications, basic statement texts included in the applications, key words such as shopping, chatting, whether and/or global positioning system (GPS) extracted from the applications may be a basis for categorizing the plurality of applications.

In operation 504b, the method includes detecting an event by the event detection unit 206. The event includes switching to the background screen from the foreground screen. The user switches to the background screen from the foreground screen of the electronic device. The event detection unit 206 detects the switching event.

In operation 506b, the method includes rendering, by the update rendering unit 208, the statement in the categorized plurality of applications in response to the event. In response to the switching event from the user, the update rendering unit 208 renders the statement in the categorized plurality of applications in response to the event.

Various actions, acts, blocks, operations, or the like in the method and the flow diagram 500b may be performed in the order presented, in a different order or simultaneously. Further, in some embodiments, some of the actions, acts, blocks, operations, or the like may be omitted, added, modified, skipped, or the like without departing from the scope of the disclosure.

Figure 6A:
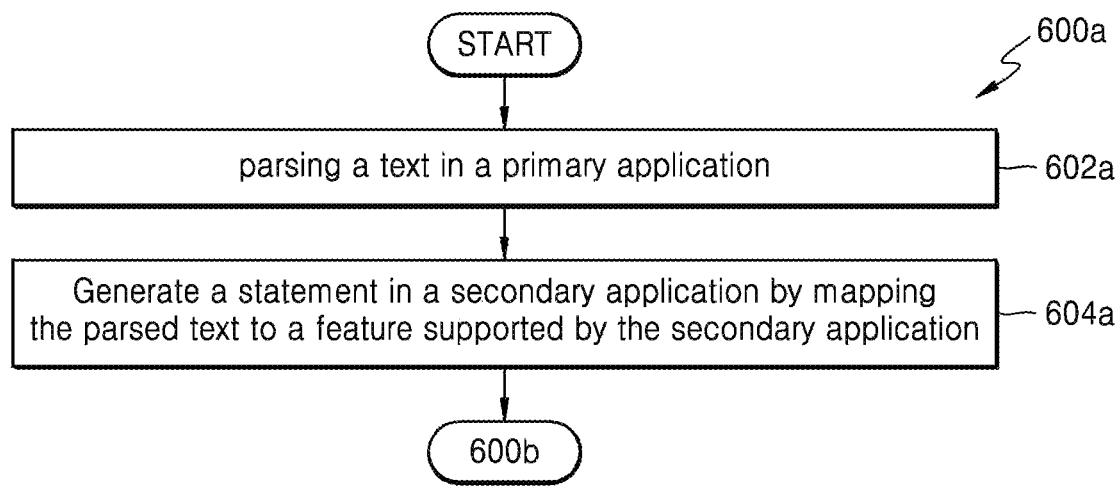
FIG. 6A is a flow diagram illustrating a method of generating a statement in a secondary application according to an embodiment of the present disclosure.

FIG. 6A is a flow diagram illustrating a method of generating a statement in a secondary application according to an embodiment of the present disclosure.

Referring to FIG. 6A, in operation 602a of a flow diagram 600a, the method includes parsing a text in a primary application by the update management unit 202. In an example embodiment of the present disclosure, the primary application is a message application or a chat application. For example, it is considered that the user is chatting with a friend on a chat application on the foreground screen of the electronic device 100. Then, the update management unit 202 parses the text in the chat application.

In operation 604a, the method includes generating a statement in the secondary application by mapping the parsed text to a feature supported by the secondary application. The statement generation unit 204 may generate the statement in the secondary application by mapping the parsed text to a feature or a field supported by the secondary application. The statement is generated in the secondary application by parsing the text in the primary application. In an example embodiment of the present disclosure, if the text in the chat application is about meeting at a hotel, then the secondary application may be a cab booking application that is used by the user to reach the hotel. The generated statement enables the user to book a cab in the second (secondary) application. For example, in the primary application, the content of chatting indicates "we'd better see at hotel", "how about Prima?", "5 PM, December 24 will be OK". The electronic device parses the text and recognizes that the destination on 5 PM of December 24 is Hotel Prima. The electronic device fills the destination field in the secondary application with "Prima Hotel" and the time field in the secondary application with "4 PM, December 24, based on time used for transportation.

Various actions, acts, blocks, operations, or the like in the method and the flow diagram 600a may be performed in the order presented, in a different order, or simultaneously. Further, in some embodiments, some of the actions, acts, blocks, operations, or the like may be omitted, added, modified, skipped, or the like without departing from the scope of the disclosure.

Figure 6B:
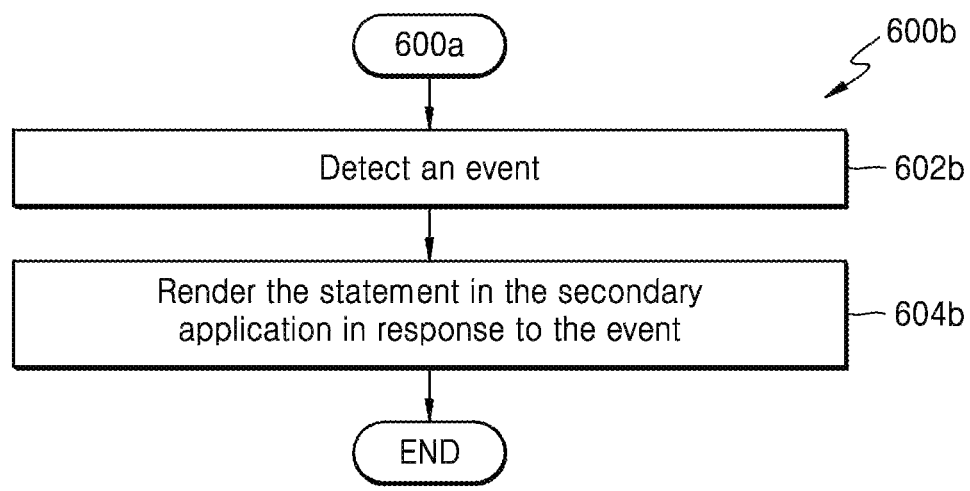
FIG. 6B is a flow diagram illustrating a method of rendering a statement in a secondary application according to an embodiment of the present disclosure.

FIG. 6B is a flow diagram illustrating a method of rendering a statement in a secondary application according to an embodiment of the present disclosure.

Referring to FIG. 6B, in a flow diagram 600b, the operations of the flow diagram 600a as described in the FIG. 6A are initially performed.

In operation 602b, the method includes detecting an event by the event detection unit 206. The event may be switching, by the user, to the background screen from the foreground screen of the electronic device 100.

In operation 604b, the method includes rendering, by the update rendering unit 208, the statement in the secondary application in response to the event. Based on the detected event, the update rendering unit 208 renders the statement in the secondary application. The statement rendered in the secondary application enables the user to book the cab to the hotel in the cab booking application.

Figure 6C:
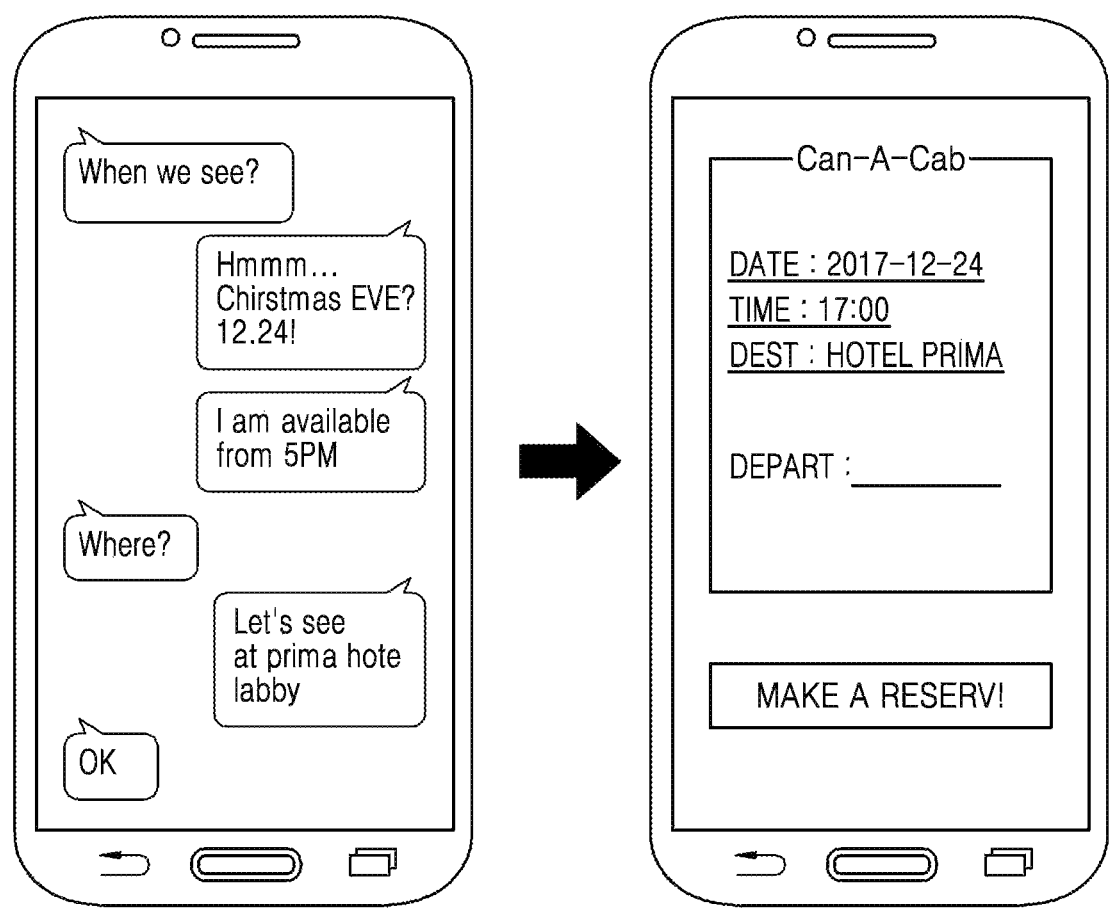
FIG. 6C illustrates a scenario of providing statements generated in a primary application to a secondary application according to an embodiment of the present disclosure.

FIG. 6C illustrates a scenario of providing or rendering statements generated in a primary application to a secondary application according to an embodiment of the present disclosure.

Referring to FIG. 6C, an example embodiment regarding rendering the statement in the secondary application in response to the event is as follows. In an example embodiment of the present disclosure, a user may chat with a friend to meet at Prima Hotel at 5 PM on December 24 by using a chatting application on the electronic device 100. The electronic device 100, triggered by an event, may generate statements derived from the chatting on the chatting application, which is the first application, and reflects the generated statements on a taxi reservation application, which is the secondary application. In an example embodiment of the present disclosure, the automatic inputting of reservations details such as a date, a location, and a destination is performed on the second application based on the content of the chatting application.

The statement generated can be rendered in various forms. For example, the statement can be displayed on a second application as illustrated above, on a widget application, or on a pop-up window, etc.

Figure 7A:
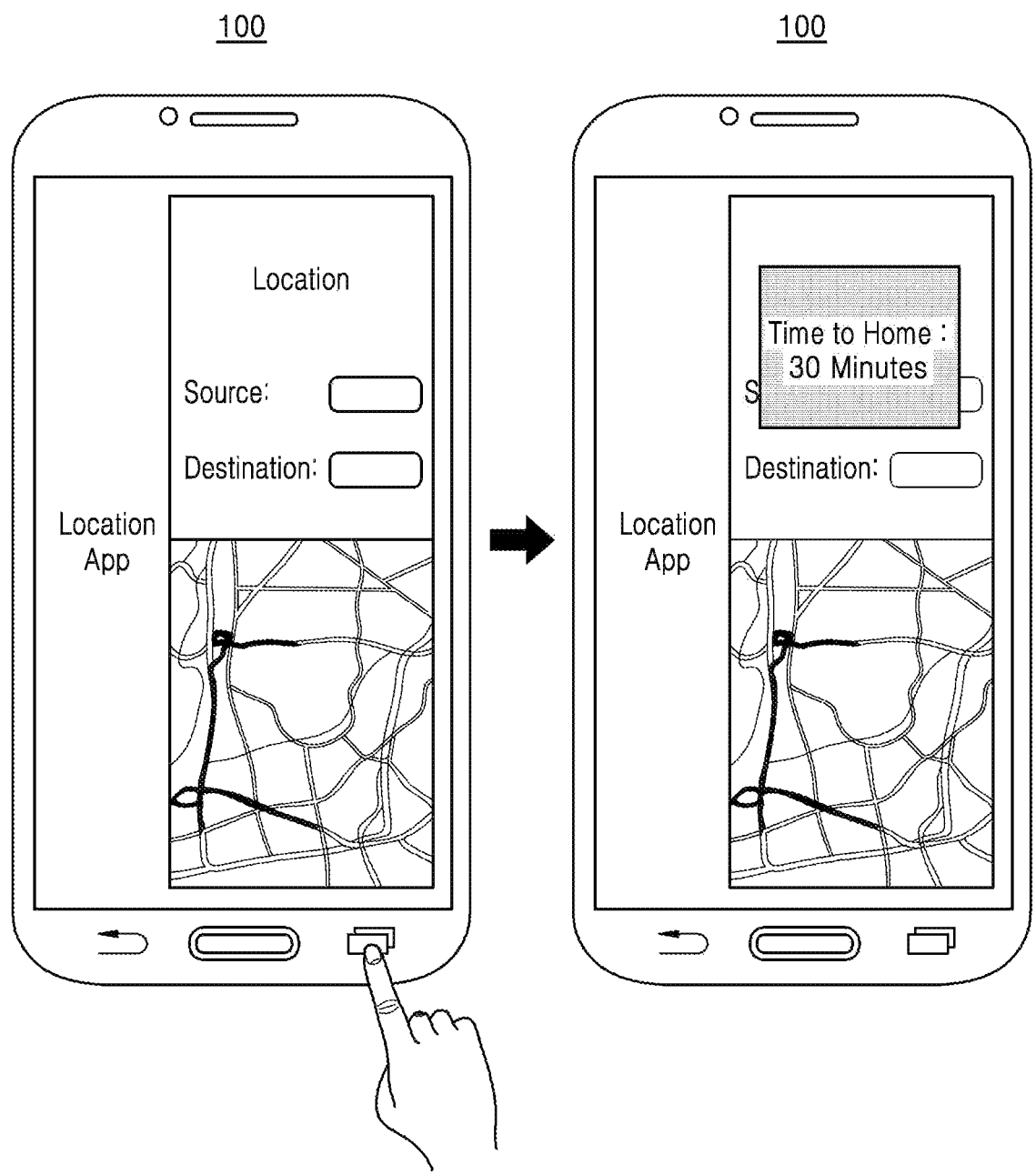
FIG. 7A illustrates a scenario of presenting a statement corresponding to an update of content of a location application according to an embodiment of the present disclosure.

FIG. 7A illustrates a scenario of presenting a statement corresponding to an update of content of a location application according to an embodiment of the present disclosure.

Referring to FIG. 7A, the update management unit 202 determines whether the update (i.e., time to home: 30 minutes) of the content of the location application was performed. The update is associated with an activity related to the content accessed by the user in the location application in the foreground screen. Based on the determined update, the statement generation unit 204 generates a statement corresponding to the update of the content of the location application in accordance with the activity related to the content. The event detection unit 206 detects an event of switching from the foreground screen to the background screen of the electronic device 100. The event of switching from the foreground screen to the background screen triggers rendering of the statement in the location application. The update rendering unit 208 renders the update in the form of the statement by overlaying the statement on the application content in the background screen as shown in FIG. 7A.

Figure 7B:
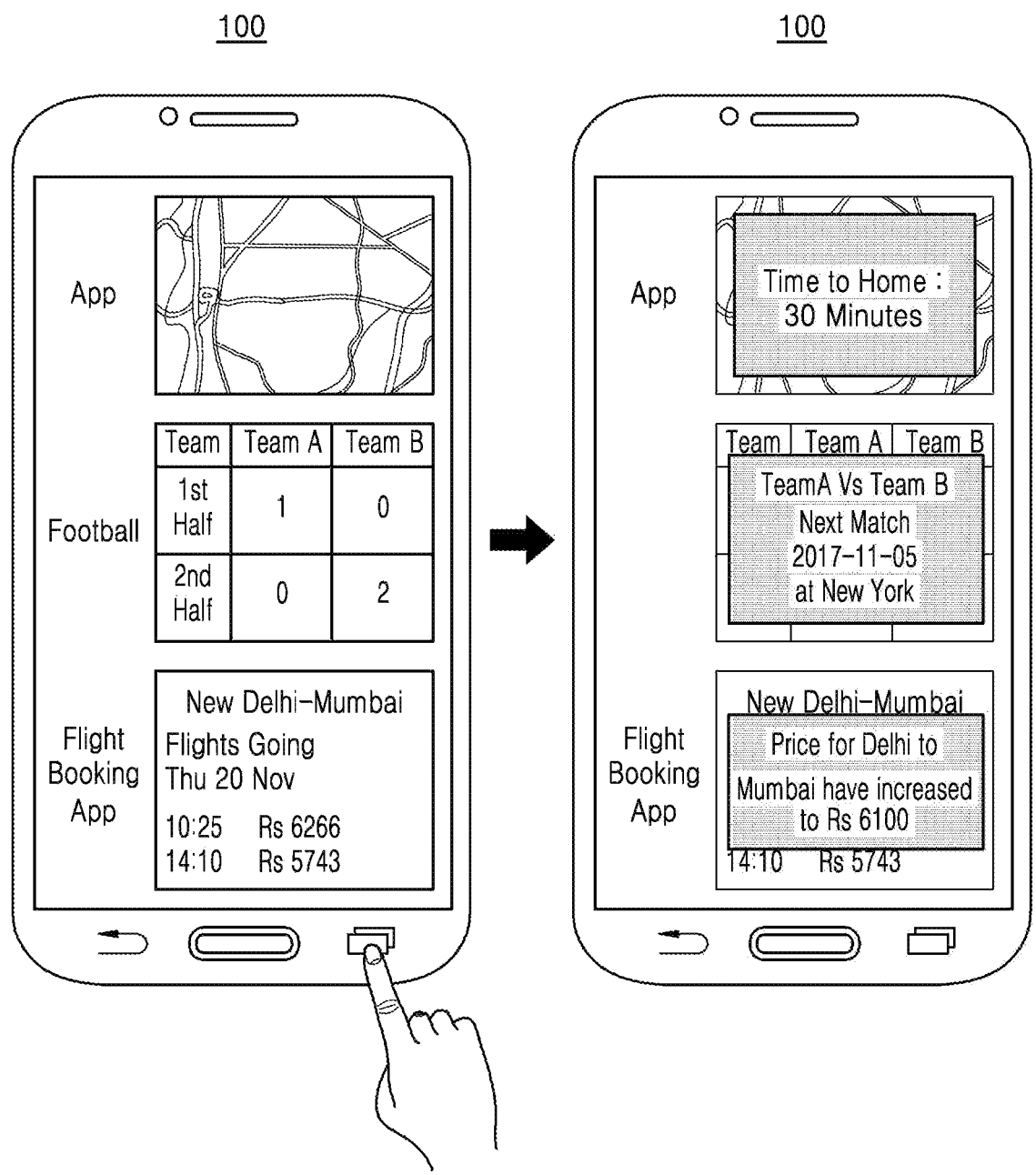
FIG. 7B illustrates a scenario of presenting a plurality of statements corresponding to updates of content of a plurality of applications according to an embodiment of the present disclosure.

FIG. 7B illustrates a scenario of presenting a plurality of statements corresponding to updates of content of a plurality of applications according to an embodiment of the present disclosure.

Referring to FIG. 7B, the update management unit 202 determines whether updates of the content of the plurality of applications such as a map application, a football application, and a flight booking application were performed. The updates are associated with an activity related to the content accessed by the user in the above mentioned applications. The user activity includes checking the distance between his/her office and home in the map application in the foreground, checking the score of an ongoing match between team A and Team B in the football application, and checking flights from New York to San Francisco. Based on the determined updates of the plurality of the applications, the statement generation unit 204 generates a plurality of statements corresponding to the updates of the content of the map application, the football application, and the flight booking application in accordance with the activity in the content. The event detection unit 206 detects the event of switching from the foreground screen to the background screen of the electronic device 100. The event of switching the foreground screen to the background screen triggers rendering of the statement in the above-mentioned applications. The update rendering unit 208 renders the update in the form of the statement by overlaying the statement on the plurality of the application content in the background screen. The map application renders the statement (i.e., time to home: 30 minutes) by overlaying the content on the map application. The football application renders the statement by overlaying the statement on the football application as shown in FIG. 7B. Similarly, the flight booking application renders the statement by overlaying statement on the content on the flight booking application in the background screen of the electronic device 100 as shown in FIG. 7B.

Figure 8:
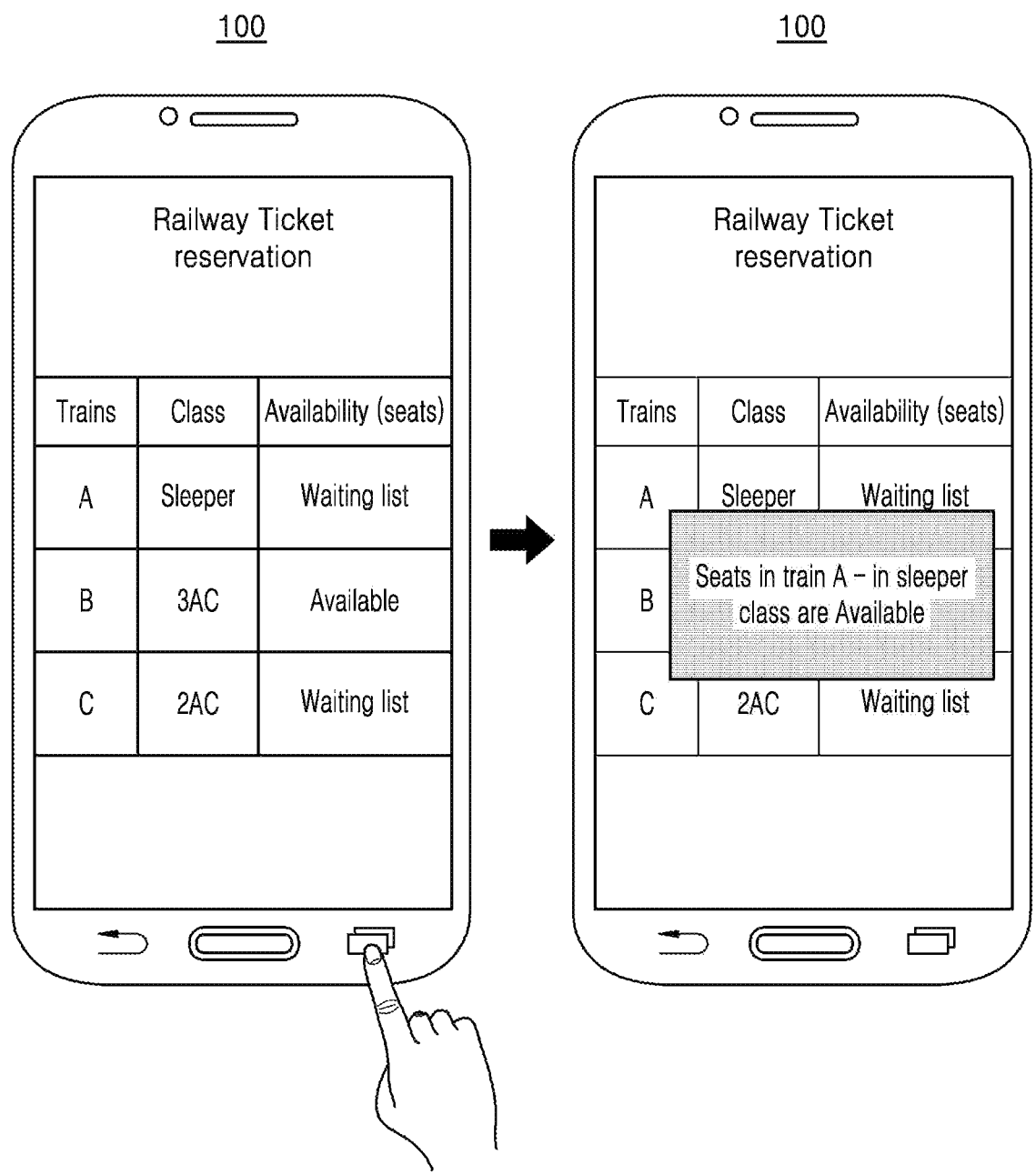
FIG. 8 illustrates a scenario of presenting a statement corresponding to an update of content of a railway application according to an embodiment of the present disclosure.

FIG. 8 illustrates a scenario of presenting a statement corresponding to an update of content of a railway application according to an embodiment of the present disclosure.

Referring to FIG. 8, the user of the electronic device 100 checks the availability of seats on a Train A in the railway ticket reservation application. At that time, the user checks the availability of tickets in a waiting list. Based on the user activity in the railway ticket reservation application, the statement generation unit 204 generates a statement if any update is available in the railway ticket reservation application related to the user activity. The update rendering unit 208 renders the statement by overlaying the statement on the content of the railway ticket reservation application, when the user switches to the background screen from the foreground screen. The rendered statement shows that seats on the train A are available in the sleeper class as shown in FIG. 8.

Figure 9:
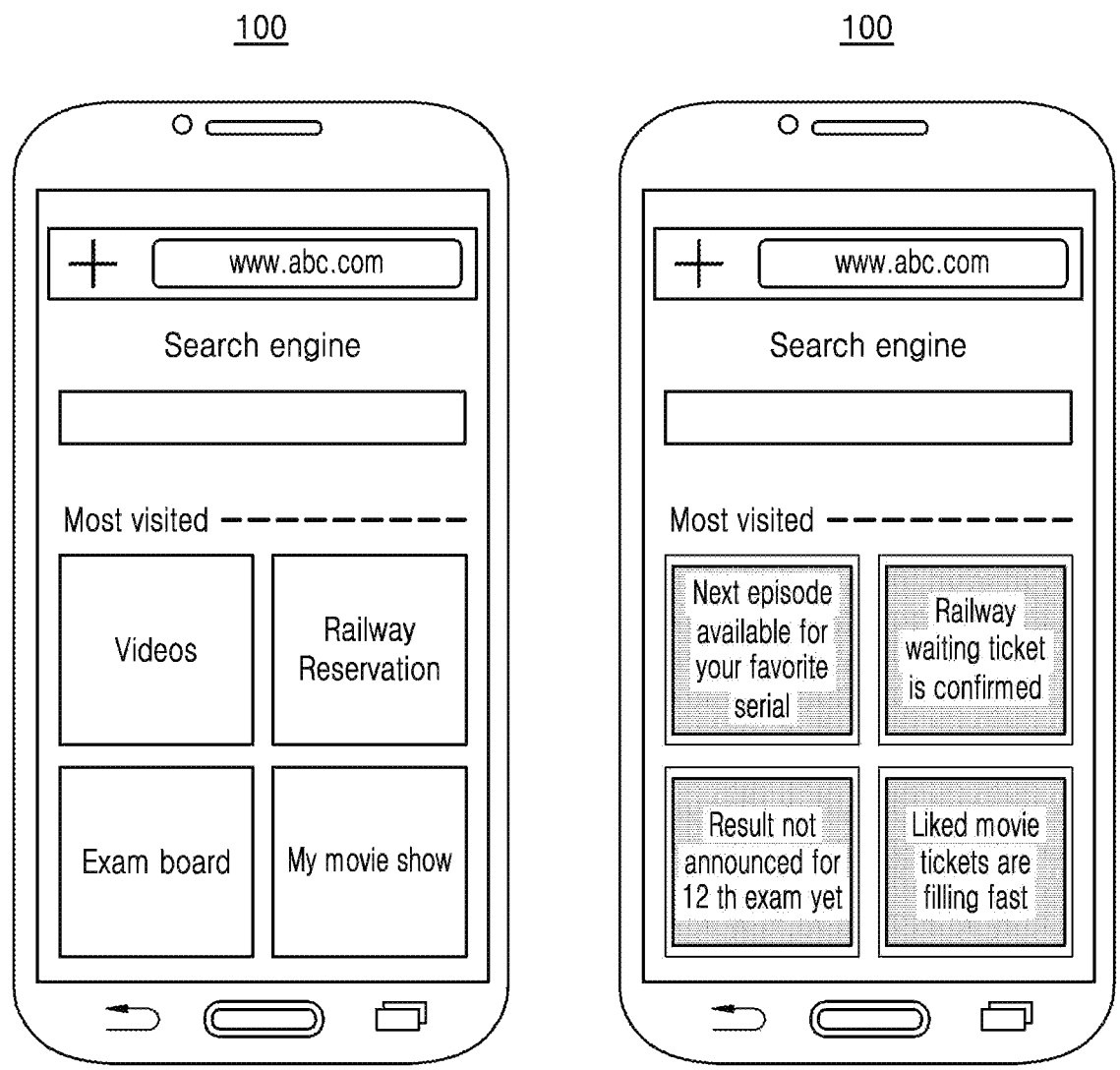
FIG. 9 illustrates a scenario of presenting a plurality of statements on a webpage corresponding to updates of content of a plurality of webpages according to an embodiment of the present disclosure.

FIG. 9 illustrates a scenario of presenting a plurality of statements on a webpage corresponding to updates of content of a plurality of webpages according to an embodiment of the present disclosure.

Referring to FIG. 9, the user of the electronic device 100 is browsing a plurality of websites such as a websites related to videos, a railway reservation website for booking tickets or checking status of booked tickets, a board exam website for checking examination results, and my movie show website for checking movie releases and booking movie tickets. Based on the user activity in the above-mentioned websites, the statement generation unit 204 generates the statement if any update is available in the above-mentioned websites. The update rendering unit 208 renders the available updates in the form of the statements by overlaying the statements on the thumbnails of the above-mentioned webpages on a home screen of the browser, as shown in FIG. 9.

Figure 10:
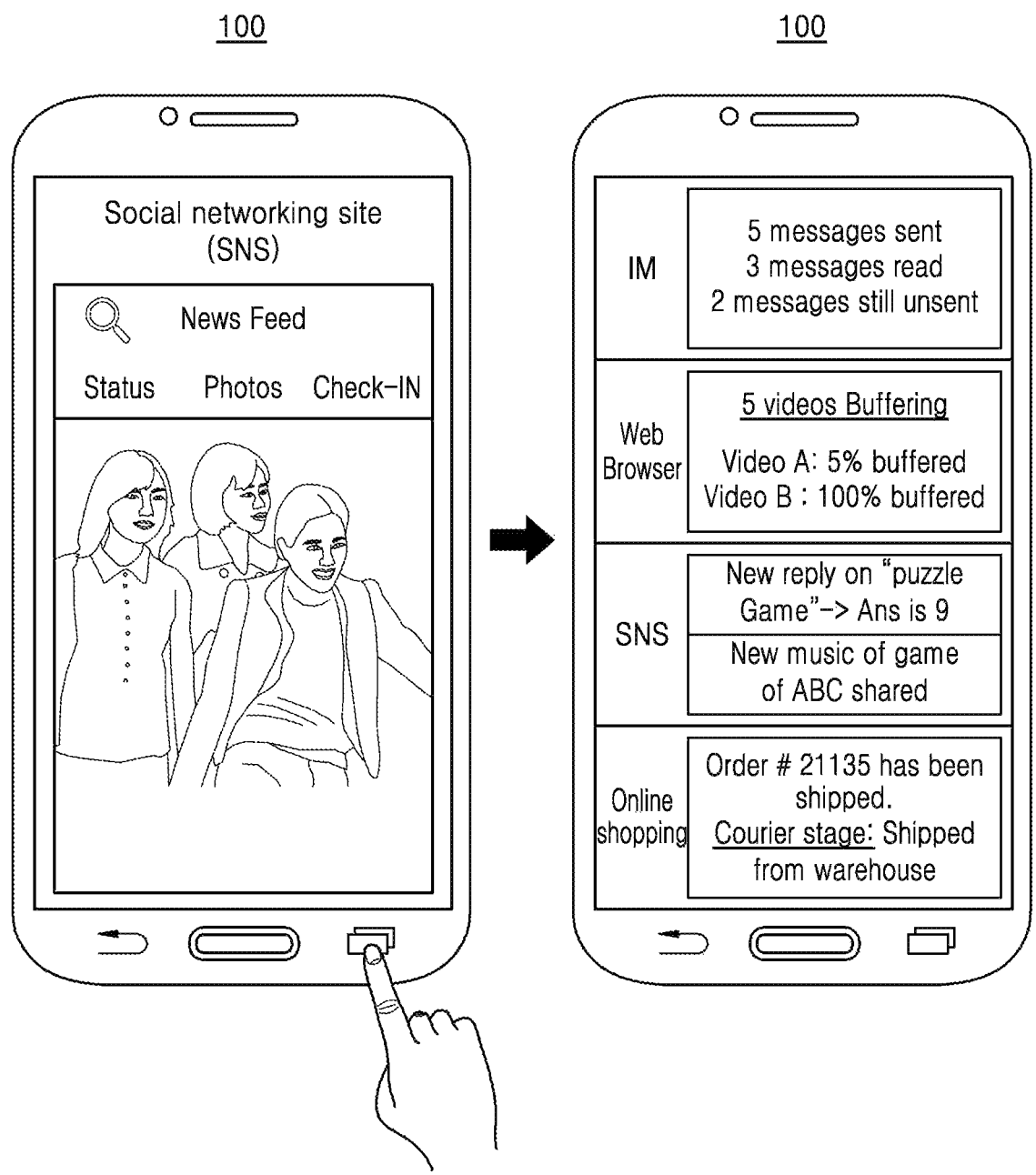
FIG. 10 illustrates a scenario of presenting a plurality of statements corresponding to updates of content of a plurality of applications according to an embodiment of the present disclosure.

FIG. 10 illustrates a scenario of presenting a plurality of statements corresponding to updates of content of a plurality of applications according to an embodiment of the present disclosure.

Referring to FIG. 10, the user of the electronic device 100 is accessing a plurality of applications such as an instant messaging (IM) application, a web browser application, a social networking services (SNS) application and an online shopping application in the foreground screen of the electronic device 100. Further, when the user switches from the foreground screen to the background screen, the statement generation unit 204 generates the statements for the available updates in the plurality of the applications based on the user activity. The update rendering unit 208 renders the available updates in the form of the statements by overlaying the statements on the corresponding application in the background screen of the electronic device 100 as shown in FIG. 10.

Figure 11:
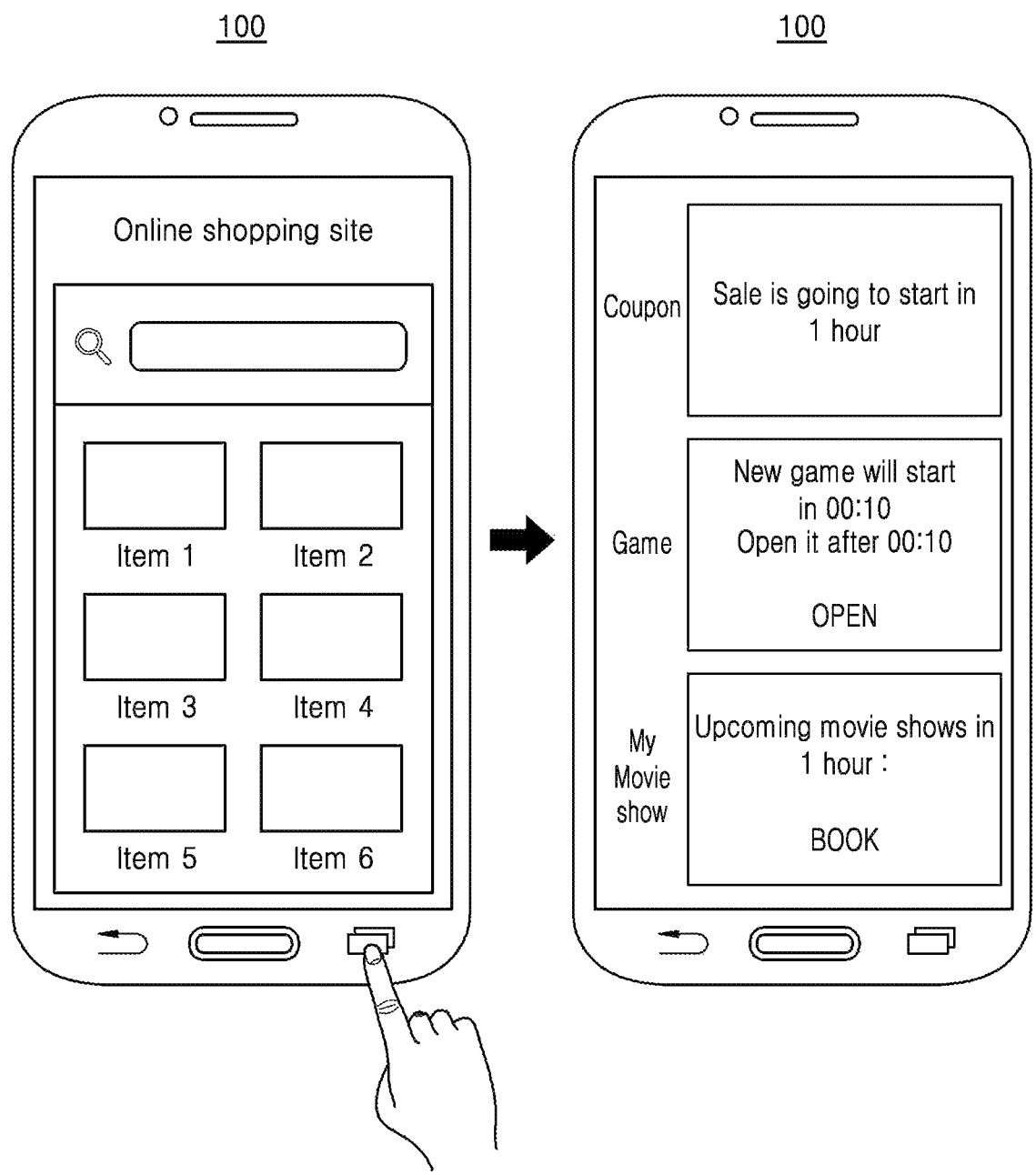
FIG. 11 illustrates a scenario of presenting a plurality of statements respectively corresponding to updates of content of a plurality of applications according to an embodiment of the present disclosure.

FIG. 11 illustrates a scenario of presenting a plurality of statements corresponding to updates of content of a plurality of applications according to an embodiment of the present disclosure.

Referring to FIG. 11, the user of the electronic device 100 is accessing a plurality of applications such as an online shopping application for shopping items, an SNS, and a my movie show application for booking tickets online in the foreground screen of the electronic device 100. Further, when the user switches from the foreground screen to the background screen, the statement generation unit 204 generates the statements based on the user activity. In an example embodiment of the present disclosure, if the user is searching for some items in the online shopping site in the foreground screen of the electronic device 100 and later the user switches from the foreground screen to the background screen, the update rendering unit 208 renders the available updates in the form of the statements by overlaying the generated statements on the corresponding applications as shown in FIG. 11.

Figure 12:
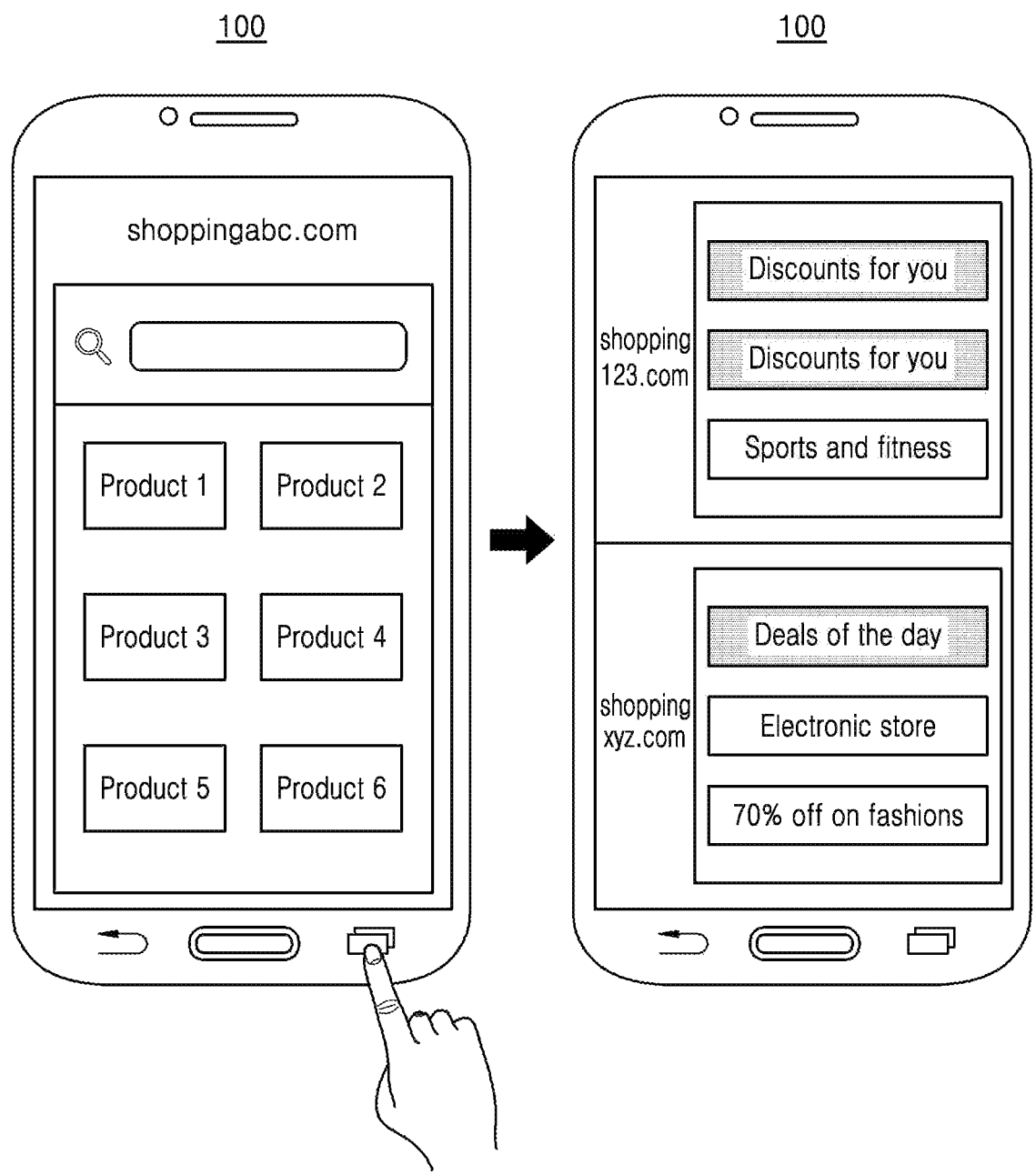
FIG. 12 illustrates a scenario of presenting a plurality of statements respectively corresponding to updates of content of a plurality of applications according to an embodiment of the present disclosure.

FIG. 12 illustrates a scenario of presenting a plurality of statements corresponding to updates of content of a plurality of applications according to an embodiment of the present disclosure.

Referring to FIG. 12, the user of the electronic device 100 is accessing a plurality of online shopping applications such as shopping abc.com, shopping 123.com, and shopping xyz.com in the foreground screen of the electronic device 100. Further, when the user switches from the foreground screen to the background screen, the statement generation unit 204 generates statements based on the user activity. According to an embodiment of the present disclosure, if the user is searching for some items in one of the online shopping sites in the foreground screen of the electronic device 100, and further, the user switches from the foreground screen to the background screen, the update rendering unit 208 renders the available updates in the form of the statements by overlaying the generated statements on the corresponding applications as shown in FIG. 12. The update rendering unit 208 renders the available updates such as discounts available to the user on the online shopping application, i.e., shopping 123.com and deals of the day and electronic store and 70% price discounts on fashion items as shown in FIG. 12.

Figure 13:
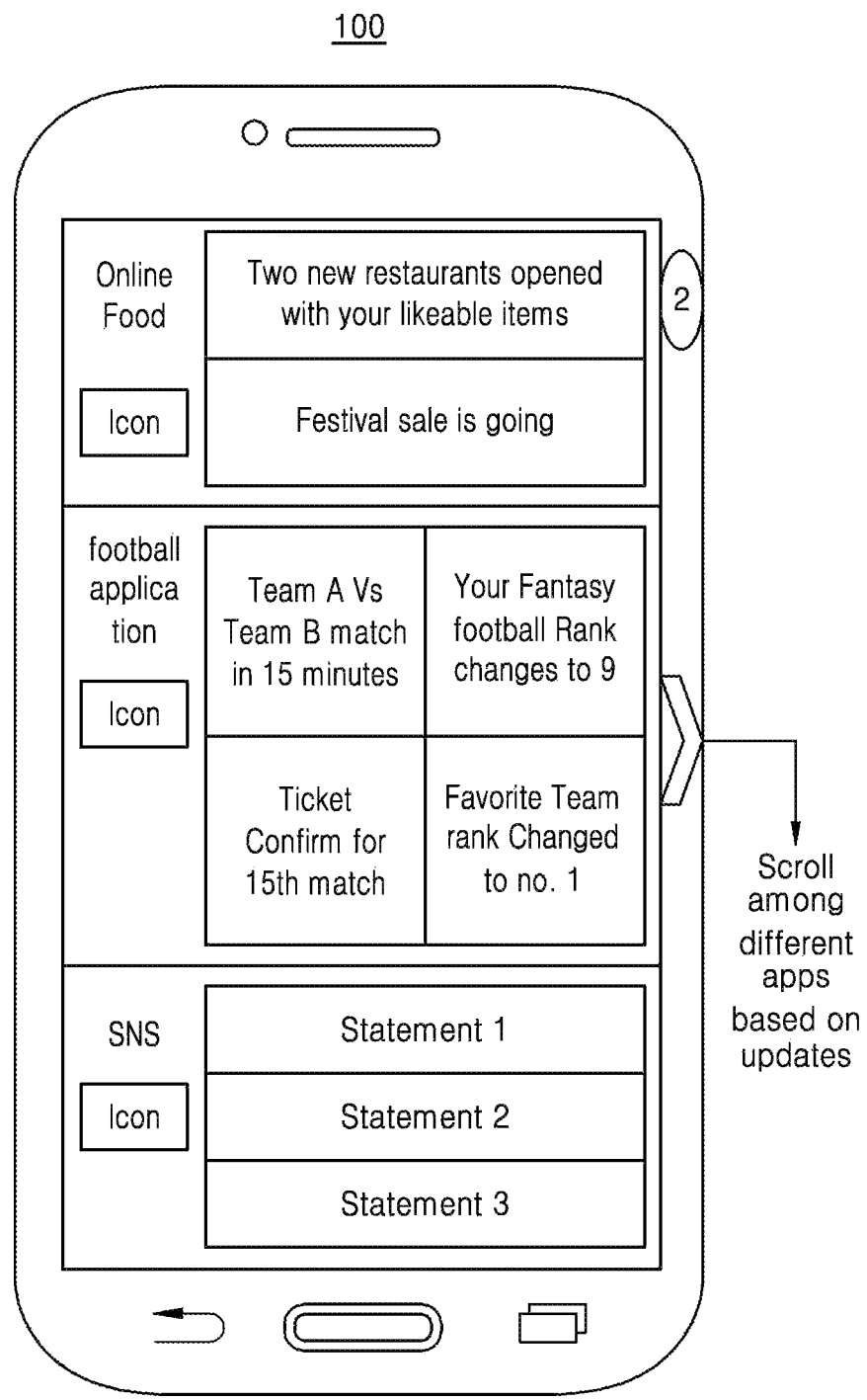
FIG. 13 illustrates a scenario of presenting a plurality of statements respectively corresponding to a plurality of updates of content of an application in accordance with a plurality of activities related to the content according to an embodiment of the present disclosure.

FIG. 13 illustrates a scenario of presenting a plurality of statements corresponding to a plurality of updates of content of an application in accordance with a plurality of activities related to the content according to an embodiment of the present disclosure.

Referring to FIG. 13, the user of the electronic device 100 is accessing a plurality of applications such as an online food application, a football application, and an SNS application in the foreground screen of the electronic device 100. Further, when the user switches from the foreground screen to the background screen, the statement generation unit 204 generates statements based on the user activity. According to an embodiment of the present disclosure, if the user is searching for some restaurants in the online food application in the foreground screen of the electronic device 100, and further, when the user switches from the foreground screen to the background screen, the update rendering unit 208 renders the available updates in the form of statements by overlaying the generated statements on the corresponding application (i.e., the online food application) as shown in FIG. 13. Further, the update rendering unit 208 renders the available updates such as the upcoming matches, tickets availability for matches, and updates related to team rankings in the form of statements by overlaying the generated statements on the football application. Furthermore, the update rendering unit 208 renders the available updates in the form of statements such as statement 1, statement 2 and statement 3 on the SNS application as shown in FIG. 13. A scrolling option is provided to the user to scroll among different applications based on the updates of each of the applications as shown in FIG. 13.

Figure 14:
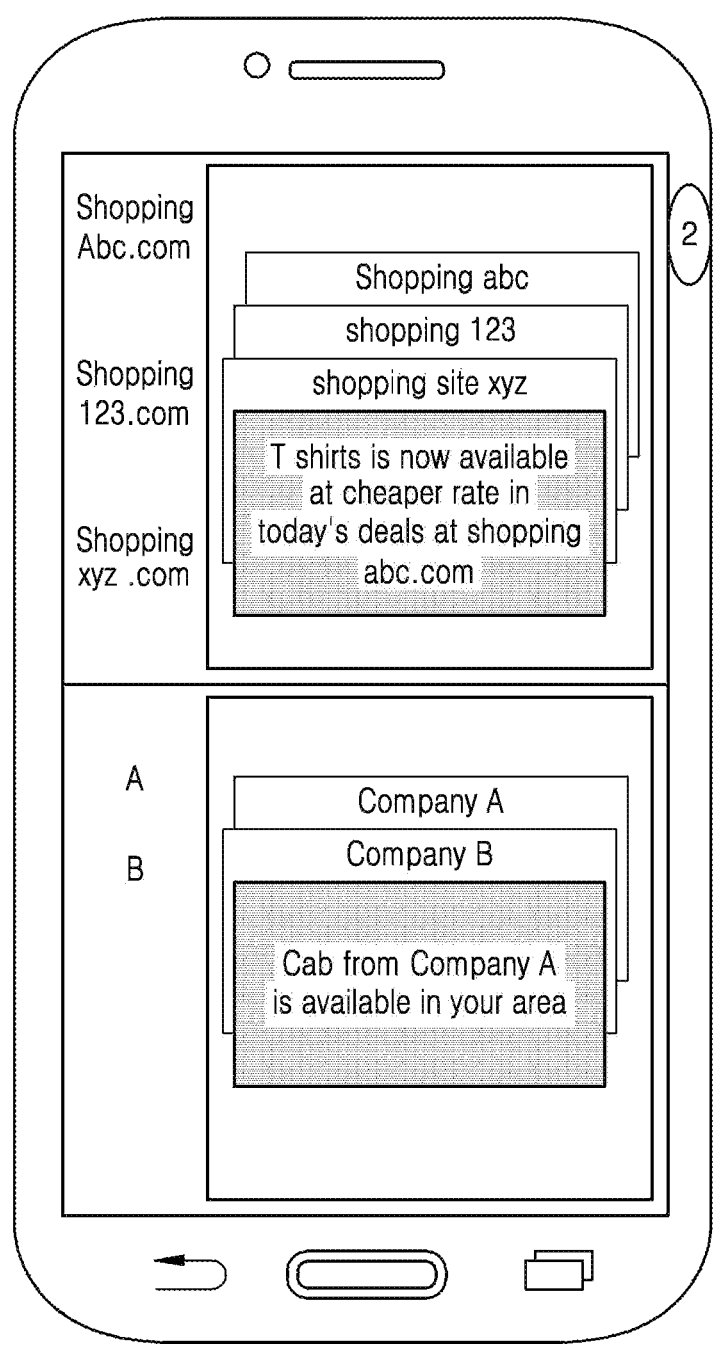
FIG. 14 illustrates a scenario of rendering a statement in a categorized plurality of applications according to an embodiment of the present disclosure.

FIG. 14 illustrates a scenario of rendering a statement in a categorized plurality of applications according to an embodiment of the present disclosure.

Referring to FIG. 14, the user of the electronic device 100 is accessing a plurality of online shopping applications and applications related to various companies in the foreground screen of the electronic device 100. Further, when the user switches from the foreground screen to the background screen, the statement generation unit 204 generates statements based on the user activity with respect to the online applications and the applications related to various companies. In an example embodiment of the present disclosure, if the user is interested in searching for T shirts in the online shopping applications in the foreground screen of the electronic device 100, and further, when the user switches from the foreground screen to the background screen, the update rendering unit 208 renders available updates in the form of statements by categorizing the updates available from the online food application and the updates in the form of statements by categorizing the updates available from the applications related to various companies as shown in FIG. 14. Further, the statement (i.e., the user interested in T-shirts, (which is the user's activity)) at the cheaper rate is highlighted as the user is interested in searching for T-shirts at cheaper rates as shown in FIG. 14.

Figure 15:
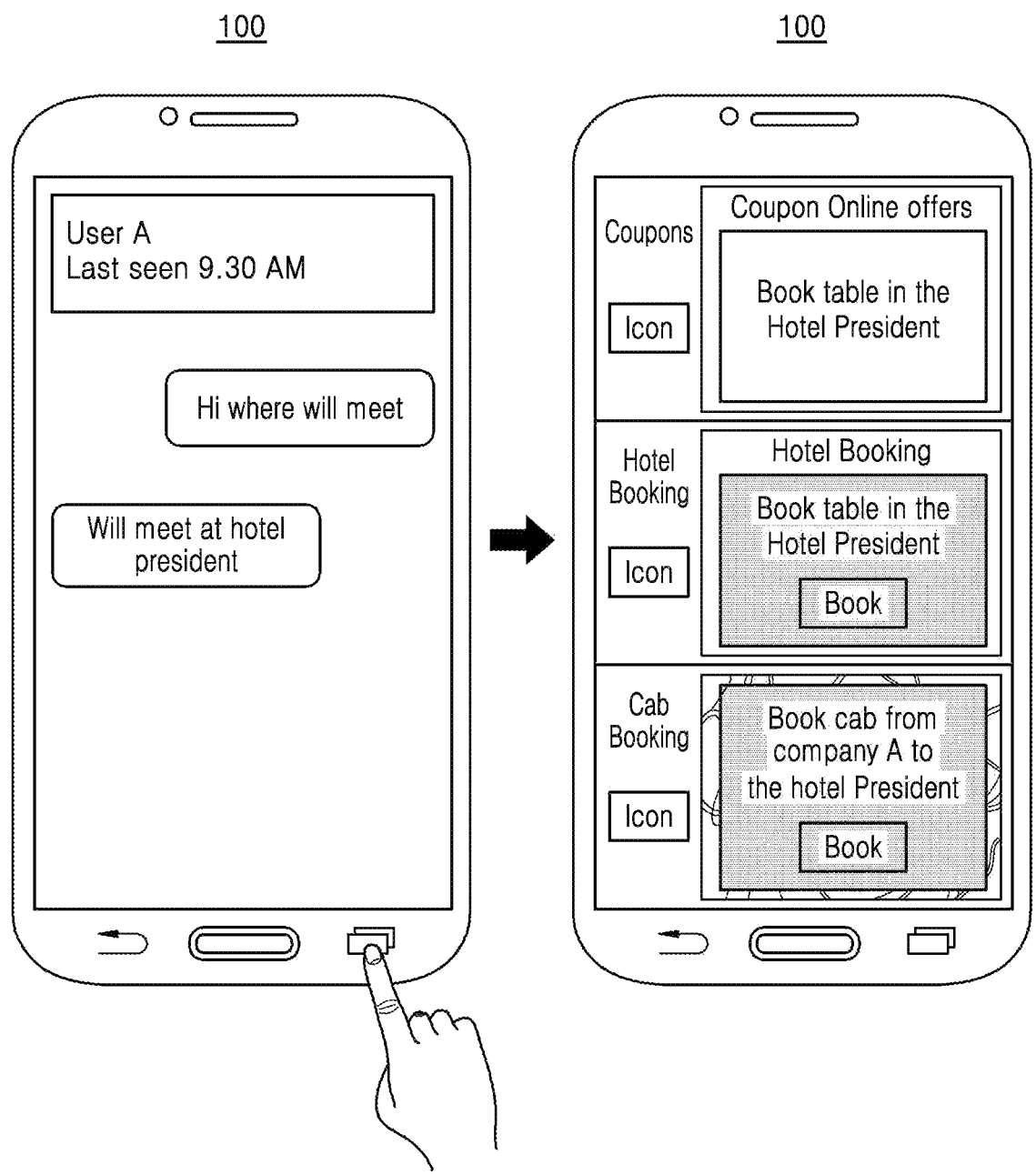
FIG. 15 illustrates a scenario of rendering a statement in a secondary application according to an embodiment of the present disclosure.

FIG. 15 illustrates a scenario of rendering a statement in a secondary application according to an embodiment of the present disclosure.

Referring to FIG. 15, the user is chatting with a friend on a chat application on the foreground screen of the electronic device 100. The update management unit 102 parses user's activity on the chat application (i.e., the text in the chat messages). When the user switches from the foreground screen to the background screen, the statement generation unit 204 generates a statement in the secondary application which may be, but is not limited to, a coupons application, a hotel booking application, a cab booking application, or the like as shown in FIG. 15. The update rendering unit 208 renders the statement in each of the secondary applications. The statement rendered in each of the secondary applications enables the user to perform activities such as checking coupons for hotels in the coupons application, booking a table in the hotel booking application, and booking a cab from company A to the hotel in a cab booking application as shown in FIG. 15.

Figure 16A:
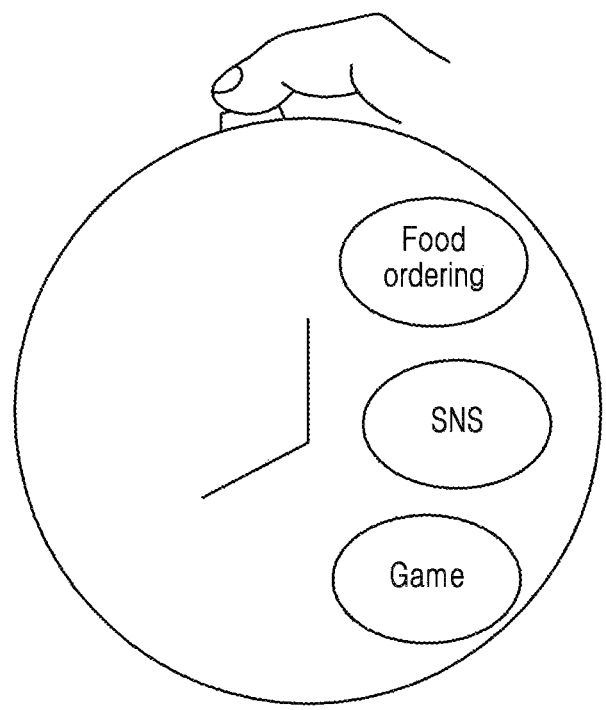
FIGS. 16A, 16B, and 16C illustrate scenarios of rendering a statement when a user points at an application on a wearable device according to various embodiments of the present disclosure.
Figure 16B:
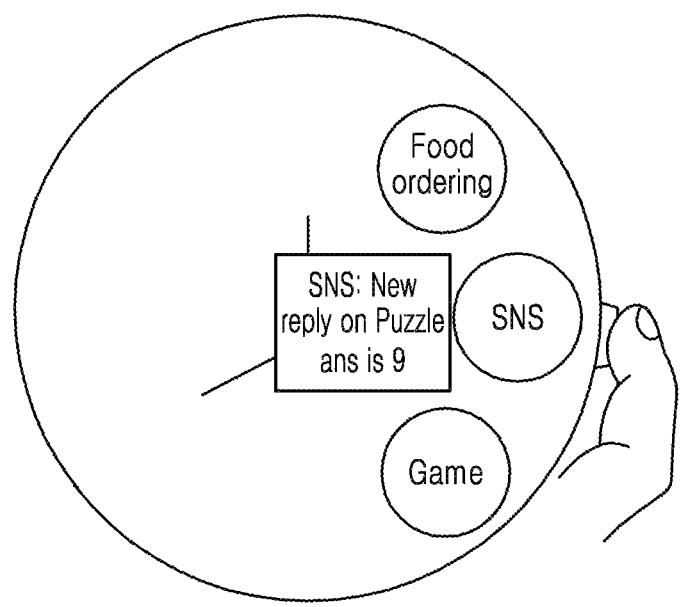
Figure 16C:
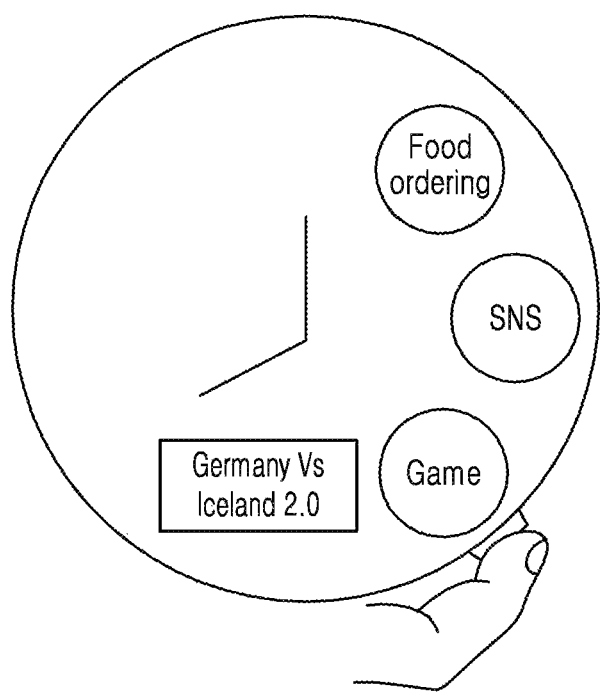

FIGS. 16A, 16B, and 16C illustrate scenarios of rendering a statement when a user is pointing at an application on a wearable device according to various embodiments of the present disclosure.

Referring to FIG. 16A, the wearable device displays applications such as a food ordering application, an SNS application, and a game application.

Referring to FIG. 16B, when the user points at the SNS application, the update rendering unit 208 renders update corresponding to the SNS application.

Further, referring to FIG. 16C, when the user points at the game application, the update rendering unit 208 renders the update corresponding the game application.

Figure 17:
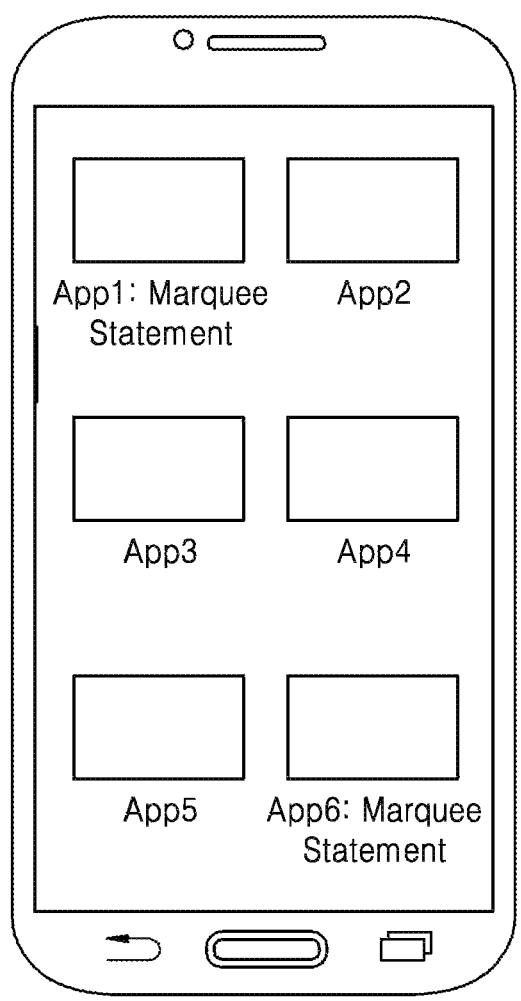
FIG. 17 illustrates a scenario of rendering a statement corresponding to an update of content of an application in a marquee form according to an embodiment of the present disclosure.

FIG. 17 illustrates a scenario of rendering a statement, in a marquee form, corresponding to an update of content of an application according to an embodiment of the present disclosure.

Referring to FIG. 17, the user is accessing a plurality of applications, namely app 1, app 2, app 3, app 4, app 5, and app 6. The user performs an activity such as browsing content on app 1 and app 6. When the user switches to the background screen from the foreground screen, the update rendering unit 208 renders the statement corresponding to the updates of app 1 and app 6 in a marquee form. For example, according to an embodiment of the present disclosure, a scrolling text appears below app 1 and app 6 as shown in FIG. 17.

Figure 18A:
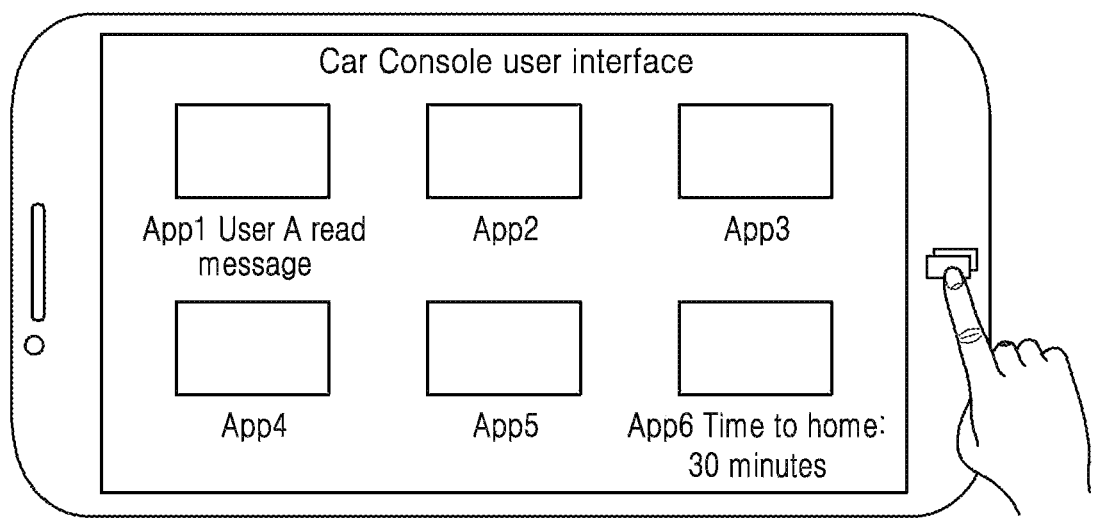
FIGS. 18A, 18B, and 18C illustrate scenarios of presenting a statement corresponding to an update of content of an application on a display of a car console according to various embodiments of the present disclosure.
Figure 18B:
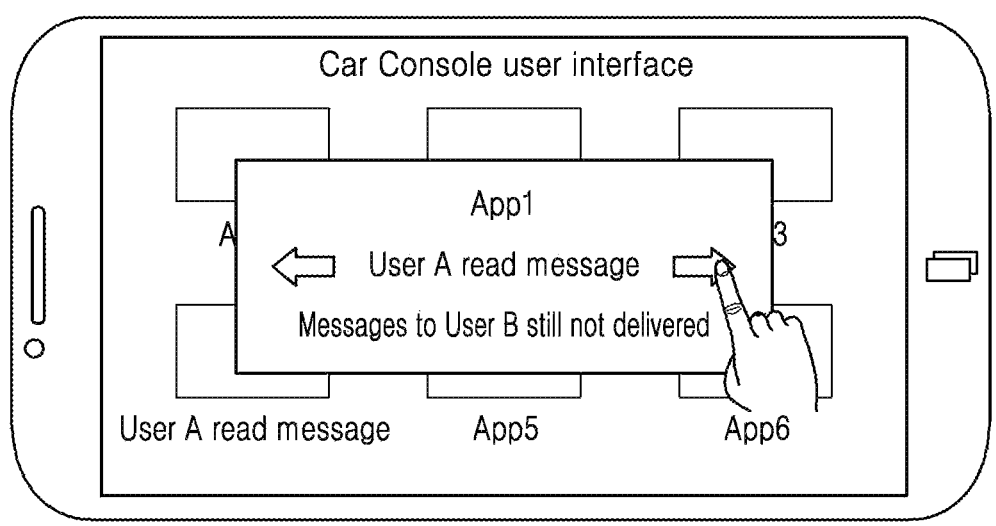
Figure 18C:
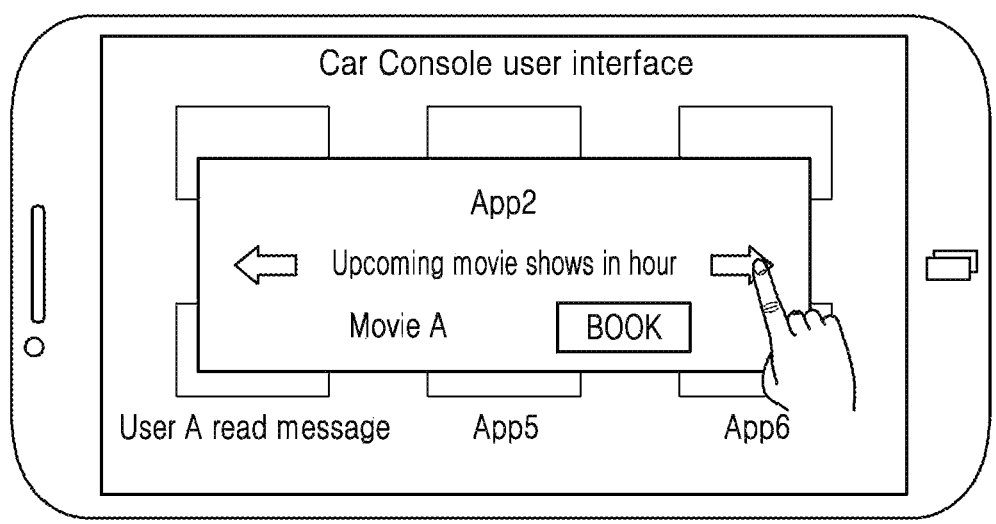

FIGS. 18A, 18B, and 18C illustrate scenarios of presenting a statement corresponding to an update of content of an application on a display of a car console according to various embodiments of the present disclosure.

Referring to FIG. 18A, the user is accessing a plurality of applications such as App1 to App6 on a car console in the foreground screen. The update rendering unit 208 renders an update in the statement corresponding to App1 and App6 as shown in FIG. 18A. Further, the user may access each of the App1 to App6 to view the statement that includes the update in each of the App1 to App6.

Referring to FIG. 18B, the user accesses App1 to view the statement that includes the update in App1.

Referring to FIG. 18C, the user may access App2 to view the statement that includes the update in App2.

Figure 19:
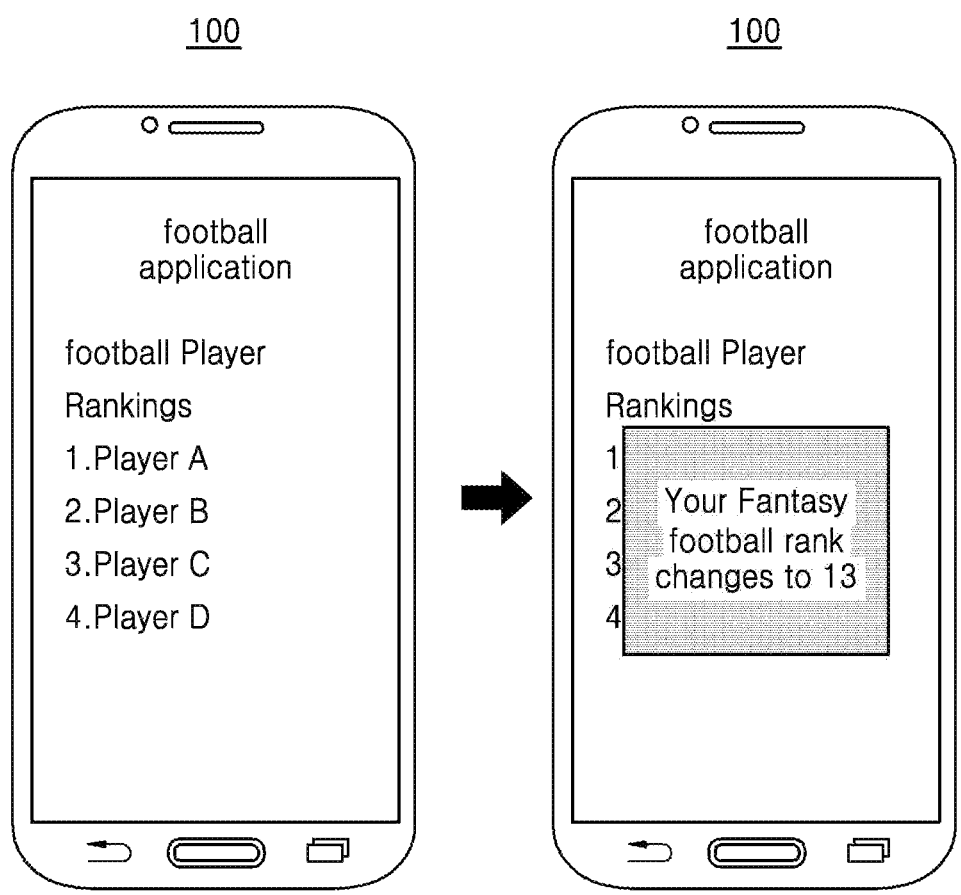
FIG. 19 illustrates a scenario of presenting a statement corresponding to an update of content of a football application according to an embodiment of the present disclosure.

FIG. 19 illustrates a scenario of presenting a statement corresponding to an update of content of a football application according to an embodiment of the present disclosure.

Referring to FIG. 19, the user is accessing a football application on the foreground screen of the electronic device 100 and searching for ratings of football players. The update management unit 202 determines whether an update with regard to ranking of a football player was performed. The statement generation unit 204 generates a statement corresponding to the update in the ranking of the football player. Further, when the user switches from the foreground screen to the background screen, the update rendering unit 208 renders the statement by overlaying the statement on the football application as shown in FIG. 19.

Figure 20:
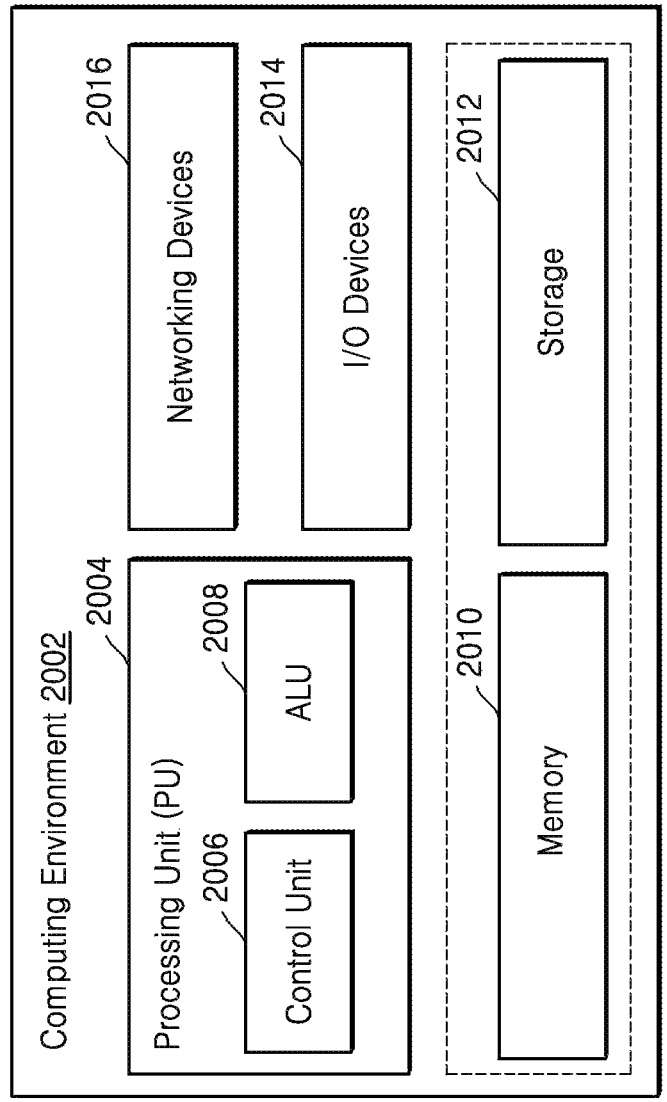
FIG. 20 illustrates a computing environment capable of using a method of generating and rendering a statement corresponding to an update of content of an application according to an embodiment of the present disclosure.

FIG. 20 illustrates a computing environment using a method of generating and rendering a statement corresponding to an update of content of an application according to an embodiment of the present disclosure.

Referring to FIG. 20, a computing environment 2002 comprises at least one processing unit 2004 including a control unit 2006, an arithmetic logic unit (ALU) 2008, a memory 2010, a storage unit 2012, a plurality of networking devices 2016, a plurality of input output (IO) devices 2014. The processing unit 2004 is capable of processing algorithm instructions. The processing unit 2004 receives commands from the control unit 2006 in order to perform processing. Further, any logical and arithmetic operations involved in the execution of the instructions are computed with the help of the ALU 2008.

The various embodiments disclosed herein may be implemented through at least one software program running on at least one hardware device and performing network management functions to control specific elements. The elements shown in 1A, 1B, 2, 3A, 3B, 4A, 4B, 5A, 5B, 6A, 6B, 6C, 7A, 7B, 8, 9, 10, 11, 12, 13, 14, 15, 16A, 16B, 16C, 17, 18A, 18B, 18C, 19, and 20 include blocks which may be at least one of a hardware device or a combination of a hardware device and a software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing a notification including a statement in an electronic device, the method comprising:
   providing, in a foreground view of a display, content of a first application of which a view is switchable from the foreground view to a background view;
   detecting one or more user activities from the content of the first application;
   determining at least one future event related to the one or more user activities related to the first application;
   receiving a user input for switching the content of the first application from the foreground view to the background view;
   detecting a switching event based on the user input for switching the content of the first application from the foreground view to the background view; and
   in response to detecting the switching event based on the user input for switching the content of the first application from the foreground view to the background view, generating a plurality of statements in a plurality of second applications running in the background view and rendering and displaying a plurality of notifications by overlaying each of the plurality of notifications on a corresponding region of each of the plurality of second applications, each notification including a statement among the plurality of statements related to the at least one future event related to the one or more user activities related to the content of the first application switching from the foreground view.

2. The method of claim 1, wherein each of the plurality of notifications is viewable as a pop-up while the content of the first application is viewable in the background view behind the plurality of notifications.

3. The method of claim 2, wherein each of the plurality of notifications is viewable as overlaid on the content of the first application viewable in the background view.

4. The method of claim 1, wherein the displaying of the plurality of notifications related to the at least one future event is performed in response to an occurrence of a notification activating event which comprises at least one of switching the electronic device from a sleep mode to an active mode, or activating the electronic device by inputting a password or unlocking the electronic device.

5. The method of claim 1,
wherein the first application is an e-commerce application,
wherein the one or more user activities are associated with searching discounted price on an item provided in the e-commerce application, and
wherein the statement included in each of the plurality of notifications is related to the discounted price on the item or a discount coupon on the item.

6. The method of claim 1, wherein the detecting of the one or more user activities from the content of the first application comprises detecting one or more user activities of accessing the content provided by the first application.

7. The method of claim 1, wherein the first application is a chat application and at least one of the plurality of notifications is linked to a booking application as one of the plurality of second applications by analyzing chats communicated in the chat application.

8. The method of claim 1, wherein the future event is determined by detecting an intent of a user derivable with the user activities related to accessing of content of the first application.

9. An apparatus for providing a notification including a statement, the apparatus comprising:
a display which provides, in a foreground view of the display, content of a first application of which a view is switchable from the foreground view to a background view; and
a hardware processor configured to:
detect one or more user activities from the content of the first application,
determine at least one future event related to the one or more user activities related to the first application,
receive a user input for switching the content of the first application from the foreground view to the background view,
detect a switching event based on the user input for switching the content of the first application from the foreground view to the background view, and
in response to detecting the switching event based on the user input for switching the content of the first application from the foreground view to the background view, generate a plurality of statements in a plurality of second applications running in the background view and control the display to render and display a plurality of notifications by overlaying each of the plurality of notifications on a corresponding region of each of the plurality of second applications, each notification including a statement related to the at least one future event related to the one or more user activities related to the content of the first application switching from the foreground view.

10. The apparatus of claim 9, wherein each of the plurality of notifications is viewable as a pop-up while the content of the first application is viewable in the background view behind the plurality of notifications.

11. The apparatus of claim 10, wherein each of the plurality of notifications is viewable as overlaid on the content of the first application viewable in the background view.

12. The apparatus of claim 9, wherein the displaying of the plurality of notifications related to the at least one future event is performed in response to an occurrence of a notification activating event which comprises at least one of switching the apparatus from a sleep mode to an active mode, or activating the apparatus by inputting a password or unlocking the apparatus.

13. The apparatus of claim 9,
wherein the first application is an e-commerce application,
wherein the one or more user activities are associated with searching discounted price on an item provided in the e-commerce application, and
wherein the statement included in each of the plurality of notifications are related to the discounted price on the item or a discount coupon on the item.

14. The apparatus of claim 9, wherein the detecting of the one or more user activities from the content of the first application comprises detecting one or more user activities of accessing the content provided by the first application.

15. The apparatus of claim 9, wherein the first application is a chat application and at least one notification among the plurality of notifications is linked to a booking application as one of the plurality of the second applications by analyzing chats communicated in the chat application.

16. The apparatus of claim 9, wherein the future event is determined by detecting an intent of a user derivable with the user activities related to accessing of content of the first application.

* * * * *